US011864211B2

(12) United States Patent
Logothetis et al.

(10) Patent No.: US 11,864,211 B2
(45) Date of Patent: *Jan. 2, 2024

(54) FREQUENCY ADJUSTMENT WITHIN A WIRELESS COMMUNICATION SYSTEM FOR A MOVING VEHICLE

(71) Applicant: AIRSPAN IP HOLDCO LLC, Boca Raton, FL (US)

(72) Inventors: Andrew Logothetis, Buckinghamshire (GB); Marlon Peter Persaud, Buckinghamshire (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,176

(22) Filed: May 20, 2022

(65) Prior Publication Data

US 2022/0330226 A1    Oct. 13, 2022

Related U.S. Application Data

(63) Continuation of application No. 16/814,553, filed on Mar. 10, 2020, now Pat. No. 11,343,825.

(30) Foreign Application Priority Data

Mar. 11, 2019 (GB) ...................... 1903217

(51) Int. Cl.
*H04W 72/51* (2023.01)
*H04W 4/029* (2018.01)
*H04W 72/0453* (2023.01)

(52) U.S. Cl.
CPC .......... *H04W 72/51* (2023.01); *H04W 4/029* (2018.02); *H04W 72/0453* (2013.01)

(58) Field of Classification Search
CPC .. H04W 72/51; H04W 4/029; H04W 72/0453
See application file for complete search history.

(56) References Cited

U.S. PATENT DOCUMENTS 5,703,595 A   12/1997  Tayloe et al.
8,547,277 B1  10/2013  Mitchell
(Continued)

FOREIGN PATENT DOCUMENTS

CN    108243391 A    7/2018
CN    107306428 B    2/2020
(Continued)

OTHER PUBLICATIONS

"Using air-to-ground LTE for in-flight ultra-broadband," Alcatel-Lucent, Strategic White Paper, 12 pages, May 2015.
GB 1903217.6—Examination Report dated Sep. 23, 2022, 5 pages.

*Primary Examiner* — Diane D Mizrahi
(74) *Attorney, Agent, or Firm* — Haynes Beffel & Wolfeld LLP; Andrew L. Dunlap

(57) ABSTRACT

A wireless communication system for a moving vehicle, and a method of operation of a wireless communication system for a moving vehicle, are described. The wireless communication system comprises an antenna system configured to receive a received signal from a further antenna system and to transmit a transmitted signal to the further antenna system, communication control circuitry to control operation of the antenna system, and analysis circuitry. The analysis circuitry is configured to obtain at least one item of information from the received signal, and perform a Doppler adjustment process to determine, based on the at least one item of information, an adjusted transmitted frequency ($f_t$) to be used for transmission of the transmitted signal from the antenna system, such that an observed frequency of the (Continued)

transmitted signal at the further antenna system is a predetermined uplink frequency ($f_{UL}$).

23 Claims, 20 Drawing Sheets

(56) References Cited

U.S. PATENT DOCUMENTS

| | | | |
|---|---|---|---|
| 8,599,956 | B1 | 12/2013 | Mitchell |
| 11,337,127 | B2 | 5/2022 | Dudzinski et al. |
| 11,343,825 | B2 * | 5/2022 | Logothetis ........ H04W 56/0035 |
| 2006/0239238 | A1 | 10/2006 | Fernandez-Corbaton et al. |
| 2007/0021121 | A1 | 1/2007 | Lane et al. |
| 2007/0021122 | A1 | 1/2007 | Lane et al. |
| 2007/0161347 | A1 | 7/2007 | Ma et al. |
| 2013/0143503 | A1 | 6/2013 | Li et al. |
| 2014/0094217 | A1 | 4/2014 | Stafford |
| 2015/0319668 | A1 | 11/2015 | Guo |
| 2015/0334707 | A1 | 11/2015 | Rajagopalan et al. |
| 2016/0173162 | A1 | 6/2016 | Undstedt et al. |
| 2017/0127332 | A1 | 5/2017 | Axmon et al. |
| 2018/0084562 | A1 | 3/2018 | Ramamurthi et al. |
| 2018/0206133 | A1 | 7/2018 | Venkatraman et al. |
| 2018/0338222 | A1 | 11/2018 | Manepalli et al. |
| 2019/0028172 | A1 | 1/2019 | Hudson et al. |
| 2019/0028950 | A1 | 1/2019 | Triolo et al. |
| 2019/0037468 | A1 | 1/2019 | Bongaarts et al. |
| 2020/0296649 | A1 | 9/2020 | Dudzinski et al. |

FOREIGN PATENT DOCUMENTS

| | | |
|---|---|---|
| EP | 2214328 A2 | 8/2010 |
| EP | 2323216 A1 | 5/2011 |
| EP | 2490389 A1 | 8/2012 |
| EP | 3030018 A1 | 6/2016 |
| EP | 3387861 A1 | 10/2018 |
| WO | 2006105316 A2 | 10/2006 |
| WO | 2006105316 A3 | 12/2006 |
| WO | 2013063789 A1 | 5/2013 |
| WO | 2014044450 A1 | 3/2014 |
| WO | 2017097997 A1 | 6/2017 |
| WO | 2018078004 A1 | 5/2018 |

* cited by examiner

FREQUENCY ADJUSTMENT WITHIN A WIRELESS COMMUNICATION SYSTEM FOR A MOVING VEHICLE

PRIORITY APPLICATIONS

This application is a continuation of U.S. patent application Ser. No. 16/814,553, filed on Mar. 10, 2020 (now U.S. Pat. No. 11,343,825), which claims priority to GB Application No. 1903217.6, filed Mar. 11, 2019. These applications are incorporated by reference herein.

BACKGROUND

The present technique relates to the field of wireless communications.

It is known to provide air-to-ground (ATG) communication systems for communication between moving aircraft and a network of ground stations. Such systems can, for example, be used to provide a Wi-Fi hotspot within the aircraft in order to provide connectivity to passengers in the aircraft. With increasing demands for higher capacity, there is a desire to support modern telecommunications Standards such as 4G (LTE) in ATG systems. However, this presents a number of technical issues.

SUMMARY

In one example arrangement, there is provided a wireless communication system for a moving vehicle, comprising: an antenna system configured to receive a received signal from a further antenna system and to transmit a transmitted signal to the further antenna system; communication control circuitry to control operation of the antenna system; and analysis circuitry configured to: obtain at least one item of information from the received signal; and perform a Doppler adjustment process to determine, based on the at least one item of information, an adjusted transmitted frequency ($f_t$) to be used for transmission of the transmitted signal from the antenna system, such that an observed frequency of the transmitted signal at the further antenna system is a predetermined uplink frequency ($f_{UL}$).

In another example arrangement, there is provided a method or of operation of a wireless communication system for a moving vehicle, comprising: receiving, at an antenna system of the wireless communication system, a received signal from a further antenna system; obtaining at least one item of information from the received signal; performing a Doppler adjustment process to determine, based on the at least one item of information, an adjusted transmitted frequency ($f_t$) to be used for transmission of a transmitted signal from the antenna system, such that an observed frequency of the transmitted signal at the further antenna system is a predetermined uplink frequency ($f_{UL}$); and transmitting, at the adjusted transmitted frequency, the transmitted signal to the further antenna system.

In yet another example arrangement, there is provided a wireless communication system for a moving vehicle, comprising: means for receiving a received signal from a further antenna system; means for obtaining at least one item of information from the received signal; means for performing a Doppler adjustment process to determine, based on the at least one item of information, an adjusted transmitted frequency ($f_t$) to be used for transmission of a transmitted signal, such that an observed frequency of the transmitted signal at the further antenna system is a predetermined uplink frequency ($f_{UL}$); and means for transmitting, at the adjusted transmitted frequency, the transmitted signal to the further antenna system.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
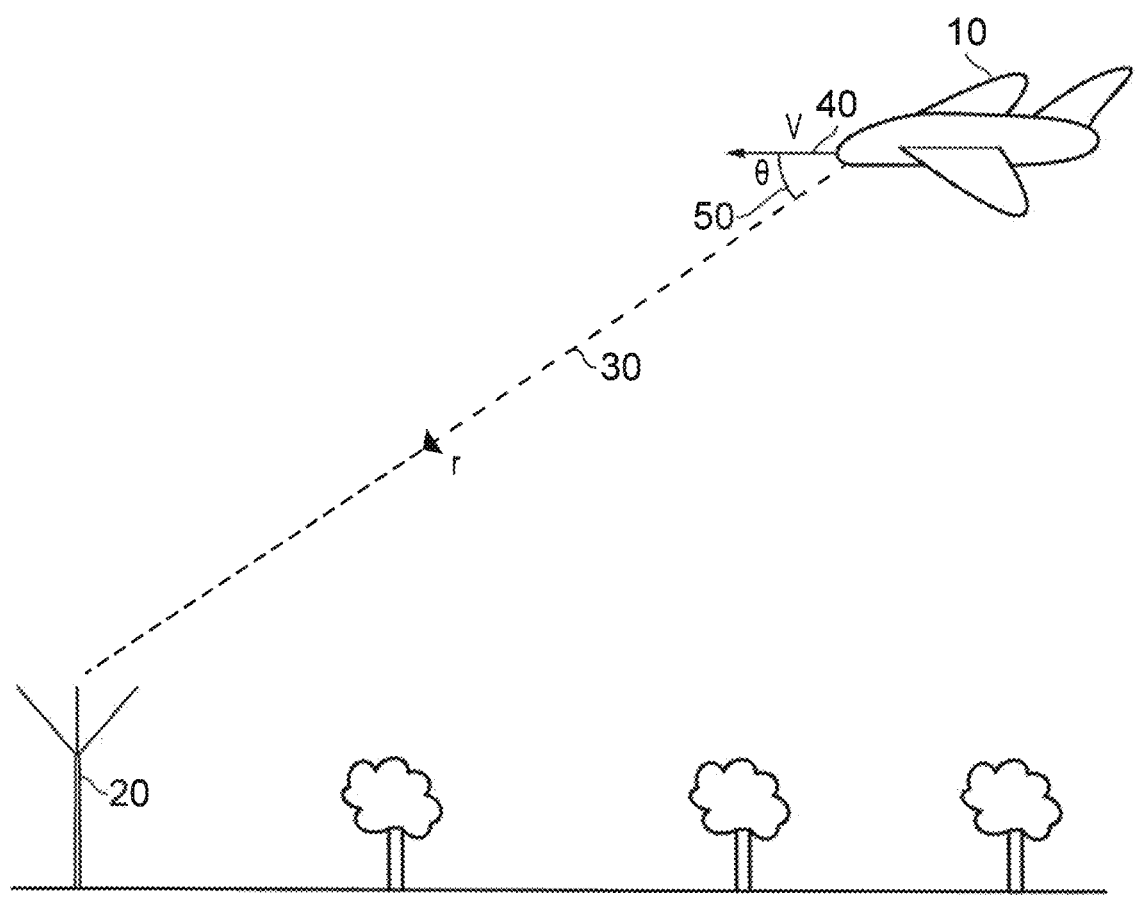
FIG. 1 is a diagram schematically illustrating an air-to-ground (ATG) communication between an aircraft and a ground station.

As mentioned earlier, a number of technical issues can arise when seeking to support modern telecommunications Standards such as 4G (LTE) in systems such as ATG systems. One particular issue that arises is interference between carrier signals due to the impact of the Doppler effect on the frequencies of signals transmitted between the ground terminal and the vehicle terminal (in the aircraft). This is particularly significant in modern telecommunications Standards such as 4G, due to the high frequency of signals that are transmitted according to these Standards—coupled with the high speeds with which modern aeroplanes travel, this means that the Doppler effect can be significant in ATG communication, since the Doppler effect is dependent on both the velocity of the vehicle and the frequency of the signal.

While it may be possible to mitigate some of the problems caused by the Doppler effect by choosing modulation schemes for the signals that are more resilient to interference, such schemes typically result in reduced throughput, which has the unwanted effect of lowering the capacity of communication in the system. The present technique, therefore, aims to overcome some of the issues related to the Doppler effect in ATG communication, without significantly reducing the capacity.

In a wireless communication system (e.g. the vehicle terminal in an aircraft or other vehicle) comprising an antenna system for receiving a received signal from a further antenna system (e.g. the ground terminal) and communication control circuitry for controlling operation of the antenna system, the Doppler issues described above are addressed through the use of analysis circuitry. The analysis circuitry obtains at least one item of information from the received signal, and performs a Doppler adjustment process based on that item of information to determine an adjusted transmitted frequency ($f_t$) to be used for transmission of the transmitted signal from the antenna system, such that an observed frequency of the transmitted signal at the further antenna system is a predetermined uplink frequency ($f_{UL}$).

The wireless communication system and the further antenna system may be the vehicle terminal and ground terminal in an ATG system, for example. Typically, the frequency of the received signal (f) at the wireless communication system is not known, since the reception circuitry has a feedback loop that enables the receiver to lock onto the signal without needing to know the exact frequency being used. This makes it difficult to determine an amount by which the frequency of the transmitted signal from the wireless communication system needs to be adjusted to account for the Doppler effect. However, the inventors realised that it is possible to obtain information from the received signal that would enable the adjustment to be calculated. Thus, the impact of the Doppler effect can be reduced by adjusting the transmitted frequency of the transmitted signal, enabling modern communications Standards to be implemented in ATG communication without significant interference effects or capacity reductions.

The at least one item of information obtained from the received signal can take a number of forms. For example, it may be information relating to the further antenna system, which enables a location of the further antenna system to be determined. Alternatively, the information could be information about the received signal itself.

In both cases, the information obtained is useful in calculating the adjustment to the transmitted signal needed to compensate for the Doppler effect.

In some examples, the item of information includes an identifier of the further antenna system.

An example of a ground terminal could be an eNodeB base station, which may comprise one or more cells, each cell having a unique identifier. Therefore, in one example implementation, the signal received at the vehicle terminal may include an eNodeB cell identifier (cell ID), which identifies the cell of the ground terminal from which the signal was sent. The inventors realised that this identifier could be extracted from the received signal as the at least one piece of information, to be used in the Doppler adjustment process described above. Modern telecommunications Standards such as 4G (LTE) already transmit such identifier information, and hence no modification to the communication protocol is needed when seeking to use such a telecommunications Standard in an ATG system when utilising the above approach.

In some examples, the identifier of the further antenna system can be used to determine a location of the further antenna system. Thus, the Doppler adjustment process described above can be applied using information easily extracted from the received signal.

In some examples, the wireless communication system (e.g. vehicle terminal) also comprises a storage structure to store a plurality of entries, each entry identifying a location and identifier of a respective further antenna system. The analysis circuitry can therefore be configured to determine the location of the further antenna system by accessing in the storage structure the entry corresponding to the identifier.

Thus, the location of the further antenna system can be determined using just the obtained identifier of the further antenna apparatus, extracted from the received signal.

Whilst in the above example an identifier of the further antenna system is used to identify the location of the further antenna system, in an alternative example implementation a different mechanism may be used. In particular, the at least one item of information may comprise a location of the further antenna system, i.e. the location information could be encoded directly within the signal received from the further antenna system.

In some examples, the wireless communication system also includes location specifying circuitry, configured to identify a current location of the wireless communication system.

In some examples, the location specifying circuitry is a GPS receiver. This is a particularly simple and cost effective way of determining the location of the wireless communication system.

In some examples, where the information obtained from the received signal is information that enables a location of the further antenna system to be determined, the analysis circuitry also includes distance computation circuitry to determine a relative distance between the antenna system and the further antenna system, based on the determined locations of the two systems.

The relative distance (which is the vector separation between the antenna system and the further antenna system) can thus be determined based on information obtained from the received signal. This allows the present technique to be implemented in ATG systems without the need for significant alterations to existing infrastructure.

In some examples, the analysis circuitry uses the determined relative distance between the antenna system and the further antenna system, along with the velocity of the antenna system (e.g. the velocity of the vehicle) to perform the Doppler adjustment process.

In some examples, the determined relative distance is used in the Doppler adjustment process by determining an adjustment value ($\Delta f$) representative of the change in frequency of the received signal due to the Doppler effect, determining an offset ($2\Delta f$) equal to two times the adjustment value ($\Delta f$), and using said offset to determine the adjusted transmitted frequency ($f_t$).

Thus, the adjustment made to the transmitted signal not only compensates for the Doppler effect applied to the received signal, but also compensates for the Doppler effect that will be applied to the transmitted signal between the vehicle terminal and the ground terminal.

In some examples, the information obtained from the received signal for use in the Doppler adjustment process is information about the signal itself. In particular, this could be information indicative of the received frequency of the received signal, obtained by monitoring at least one property of the received signal.

As noted above, a vehicle terminal in a typical ATG system does not typically need to know the frequency of signals it receives; instead, it merely locks onto whatever signal it does receive. However, the inventors realised that it can be useful to obtain information indicative of the received frequency, and to use this information in performing the Doppler adjustment process described above.

In some examples, the analysis circuitry performs the Doppler adjustment process to determine the transmitted frequency of the transmitted signal on the basis of a comparison between the information about the received signal and at least one expected value.

This allows the Doppler effect on the received signal to be determined by identifying how much a given property of the received signal has changed.

In some examples, the expected value is a value indicative of a predetermined downlink frequency ($f_{DL}$), which is the frequency used by the further antenna system when transmitting the received signal to the antenna system.

Thus, a value indicative of the downlink frequency ($f_{DL}$) can be compared with, for example, a value indicative of the received frequency, to identify how much the received frequency has changed.

In some examples, the antenna system is configured to receive a timing signal from a GPS transmitter, the timing signal providing accurate timing information for use by the analysis circuitry when monitoring the at least one property of the received signal.

In this way, highly accurate timing information can be determined, allowing the analysis to accurately determine the at least one item of information relating to the received signal. This improves the accuracy of the Doppler adjustment process.

In some examples, the Doppler adjustment process involves determining an offset ($2\Delta f$) equal to two times the difference between a predetermined downlink frequency ($f_{DL}$) and the received frequency ($f_r$) of the received signal, and using said offset to determine the adjusted transmitted frequency ($f_t$).

Similarly to an example mentioned above, this enables the Doppler effect in both the received and transmitted signals to be accounted for when adjusting the transmitted frequency.

In some examples, the predetermined uplink frequency ($f_{UL}$) is equal to a predetermined downlink frequency ($f_{DL}$) used by the further antenna system when transmitting the received signal to the antenna system. In such systems, the antenna system in the moving vehicle would by default transmit at the observed received frequency, and the techniques described herein adjust that default transmission frequency to compensate for the Doppler effect. However, in an alternative implementation the predetermined uplink frequency ($f_{UL}$) may differ to the predetermined downlink frequency ($f_{DL}$), and hence the default transmission frequency of the moving vehicle is decoupled from the observed received frequency, but the techniques described herein can still be used to determine an adjusted transmitted frequency ($f_t$) to be used for transmission of the transmitted signal from the antenna system.

In some examples, the moving vehicle in which the further wireless communication system is to be used is an aircraft, for example an aeroplane.

This is a particularly useful scenario in which the present technique can be utilised, due to the high speed with which aeroplanes travel. However, the system could also be used for other moving vehicles, such as high speed trains.

An additional technical issue that can arise when seeking to support modern telecommunications Standards such as 4G (LTE) in systems such as ATG systems is in relation to performing a sign-on procedure using the antenna system in a moving vehicle, in order to seek to establish a communication link with a further antenna system in the ground terminal.

In particular, when using a modern telecommunications Standard such as 4G (LTE), it is necessary during the sign-on procedure for the antenna system in the moving vehicle to issue a connection setup signal so that it can be received by the further antenna system in the ground terminal within an identified timing window. In accordance with the 4G (LTE) Standard, such a connection setup signal may be referred to as a RACH (random access channel) signal that can be issued in a random access channel during an uplink communication from the moving vehicle to the ground terminal, in order to seek to establish a communication link, and that connection setup signal is required to be received within a specific timing window. There are various formats of connection setup signal that can be used, but the maximum separation distance between the moving vehicle and ground terminal that can be supported is of the order of approximately 100 km. If the separation distance exceeds that, then the connection setup signal will not be received within the specified timing window, and a communication link will hence not be established.

However, in known ATG systems, the network of ground terminals may be such that the separation distance between the aircraft and the ground terminal with which a communication link is sought to be established may be up to 300 km. The techniques described herein provide a mechanism that enables a communication link to be established within such systems when using modern telecommunications Standards such as 4G (LTE), and hence which facilitates an increase in the capacity available when seeking to provide connectivity to passengers in the aircraft.

Whilst an aircraft is given as an example of a moving vehicle to which the techniques described herein may be applied, the techniques can be applied to other types of moving vehicles, for example a train, where the ground terminals may typically be spread out along the track.

In one example arrangement a wireless communication system for a moving vehicle is provided that comprises an antenna system to communicate with a further antenna system, and communication control circuitry to perform a sign-on procedure to seek to establish a communication link with the further antenna system. During the sign-on procedure, the communication control circuitry is arranged to issue via the antenna system a connection setup signal for receipt by the further antenna system within an identified timing window.

The wireless communication system is also provided within location specifying circuitry to identify a current location of the wireless communication system, and distance computation circuitry to obtain location information specifying a location of the further antenna system, and to determine a separation distance between the antenna system and the further antenna system.

By default, the communication control circuitry is arranged to issue the connection setup signal at a default time unless the separate distance exceeds a setup threshold distance that indicates that the use of the default time would prevent the connection setup signal being received within the identified timing window. In that event, the communication control circuitry deviates from the above default procedure, and instead applies a timing advance in order to issue the connection setup signal prior to the default time so as to cause the connection setup signal to be received by the further antenna system within the identified timing window.

By applying a timing advance, this can be used to ensure that the delay in propagation of the connection setup signal to the further antenna system is compensated for, so that that connection setup signal can still be received within the identified timing window, and hence a communication link can be successfully established.

In one example implementation the amount of the timing advance is dependent on the separation distance. Whilst the timing advance could be computed for each specific separation distance, in one example implementation timing advances can be specified for different ranges of separation distance. Hence, the communication control circuitry may be arranged to determine the amount of the timing advance dependent on which of a plurality of ranges of separation distance the currently measured separation distance falls within.

In one example implementation, the communication control circuitry is arranged to limit the amount of the timing advance so as to ensure that a receive/transmit timing constraint is not violated. Whether there is a receive/transmit timing constraint to be considered will depend on the form of communication used. For example, when using a TDD (Time Division Duplex) scheme, the antenna system will only be able to transmit signals or receive signals at any particular point in time, and this can give rise to the need to consider the possibility of a receive/transmit timing constraint when computing the timing advance to apply. However, if alternatively an FDD (Frequency Division Duplex) scheme is used, the antenna system can receive and transmit simultaneously and so such a timing constraint issue will not arise.

When using schemes that may give rise to a receive/transmit timing constraint, then depending on the type of connection setup signal sent, and the form of the identified timing window (such as the number of sub-frames defining the timing window), it may be that the timing advance that would be applied based purely on a determination of the separation distance could violate such a receive/transmit timing constraint. In particular, as mentioned above the antenna system may be arranged so that it is only able to transmit signals or receive signals at any particular point in time, and hence cannot simultaneously be transmitting and receiving signals. Communications between the antenna system and the further antenna system may occur within communication frames, and certain portions of the communication frame may be used for downlink communication whilst other portions are used for uplink communication. The receive/transmit timing constraint will hence require the antenna system to remain configured for reception during any portion of a communication frame where the antenna system may receive a downlink signal from the further antenna system. Hence, the communication control circuitry should not advance the timing to an extent where it would be seeking to transmit the communication setup signal at a time where the antenna system should still be configured for reception.

It should be noted that it is not always necessary to seek to compensate for the receive/transmit timing constraint. For example, if a certain form of connection setup signal is used (in the specific examples described hereafter that being a format where the connection setup signal is less than a sub-frame in length, and the identified timing window is a single sub-frame), then in one example implementation it is the case that the timing advance can be computed solely based on the separation distance without risk of violating the receive/transmit timing constraint.

As mentioned earlier, communications between the antenna system and the further antenna system may occur within communication frames. A communication frame can be defined in one implementation in terms of both frequency and time, and can be considered as consisting of a plurality of sub-frames. Each sub-frame may comprise a number of resource blocks, a resource block being the smallest allocable part of the communication frame.

The default time at which the connection setup signal is issued by the communication control circuitry can be specified as a time relative to a start of the communication frame.

Further, as mentioned earlier, each communication frame may comprise a plurality of sub-frames and the identified timing window may comprise one or more sub-frames.

In one example implementation, the timing advance chosen by the communication control circuitry in the event that the separation distance exceeds the setup threshold distance can be considered as a coarse timing advance. In particular, it does not need to be a precise timing advance, but merely needs to be sufficient to ensure that the entirety of the connection setup signal will be received within the identified timing window. In such implementations, when a communication link is established between the antenna system and the further antenna system, the antenna system receives a response signal that may identify a further timing advance. The communication control circuitry is then arranged, when the connection setup signal was issued by applying the timing advance, to use both the timing advance and the further timing advance to control timing of a subsequent uplink communication to the further antenna system. Hence, by using the coarse timing advance to ensure that the connection setup signal is properly received within the identified timing window, then the standard timing advice mechanism applied by the further antenna system can be used to specify an additional timing advance, that can be used in combination with the coarse timing advance to control the actual timing advance used for a subsequent uplink communication.

It should be noted that for the above process, the further antenna system does not need to be aware of the separation distance between the moving vehicle and that further antenna system, and in effect the application of a coarse timing advance by the communication control circuitry within the moving vehicle fools the further antenna system into viewing the moving vehicle as being closer than it actually is. In particular, the advancement of the issuance of the connection setup signal can compensate for a significant portion of the delay in propagation of the communication setup signal to the further antenna system.

Particular examples will now be described with reference to the Figures.

The moving vehicles for which the techniques described herein can be utilised can take a variety of forms. For instance, the techniques could be applied in respect of trains, where the ground terminals may be spread out along the track. However, for the purposes of the examples discussed herein, it will be assumed that the moving vehicle is an aircraft, such as the airplane 10 shown in FIG. 1. As shown in FIG. 1, the airplane 10 is able to communicate with a ground terminal 20 (which may also be referred to herein as a ground station). A network of ground terminals will be provided, enabling the aircraft 10 to connect to different ground terminals during a flight in order to seek to maintain a communication link that can be used to provide connectivity to passengers in the aircraft. As shown in FIG. 1, the aircraft 10 is assumed to be travelling at a velocity 40, and has a relative separation 30 between it and the ground terminal that it is connected to. This relative separation can be specified as a vector, as can the velocity 40, and there will be an angular separation between the velocity vector and the relative separation vector, namely the angle 50 shown in FIG. 1.

Figure 2:
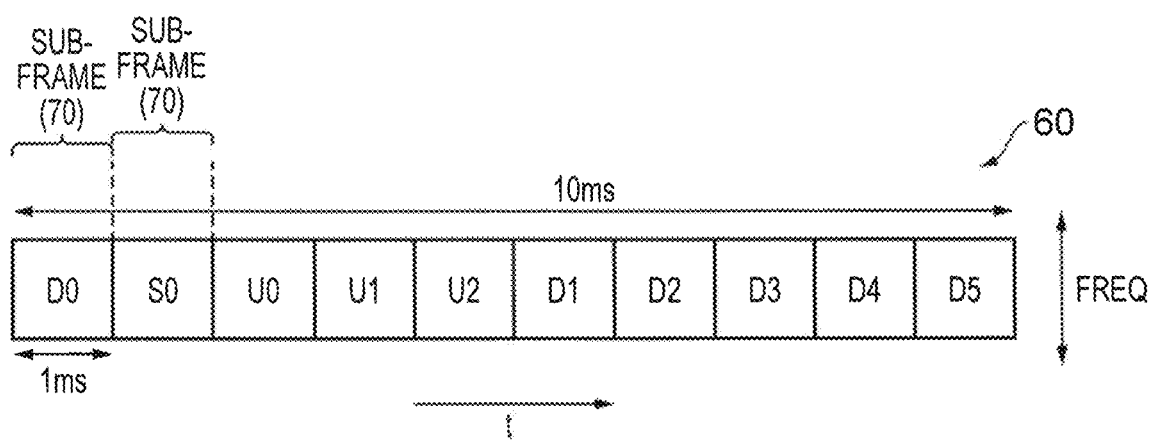
FIG. 2 schematically illustrates the format of a communication frame used in one example implementation.

Communication between the aircraft 10 and a ground station 20 with which a communication link is established can take place within communication frames. An example communication frame that may be used is illustrated in FIG. 2. Here, the communication frame 60 is defined in both the frequency and time domains. In particular, in the time domain, the frame can be considered as consisting of a plurality of sub-frames 70. In one particular example, a communication frame 60 is 10 milliseconds (ms) long, and there are ten sub-frames in the communication frame, where each sub-frame has a duration of 1 ms.

Each sub-frame 70 comprises a number of resource blocks (the resource blocks not being shown separately in FIG. 2), a resource block being the smallest allocable portion of the communication frame.

A sub-frame may be allocated for downlink communication (also referred to herein as forward link communication) from a ground terminal 20 to the aircraft 10, or can be allocated for uplink communication (also referred to herein as reverse link communication) from the aircraft 10 to the ground terminal 20. In FIG. 2, sub-frames allocated for downlink communication are prefixed with the letter "D" and sub-frames allocated for uplink communication are prefixed with the letter "U". As also shown in FIG. 2, one or more sub-frames may be allocated as special sub-frames (prefixed by the letter "S"). These can be used as a gap sub-frame to provide some separation between downlink communication and uplink communication. However, it is possible that not the entirety of the special sub-frame is left as a gap. In particular, each sub-frame can be considered as consisting of a plurality of symbols, in one particular example there being 14 symbols within each sub-frame. Hence, one or more of the symbols may be allocated for downlink communication and one or more of the symbols may be allocated for uplink communication, with the remaining symbols being left free. In one specific implementation of the communication frame format shown in FIG. 2, the first three symbols within the special sub-frame S0 can be used for downlink communication, and the final symbol may be used for uplink communication. This leaves 10 symbols free, which in one embodiment equates to a 0.712 ms gap.

Figure 3:
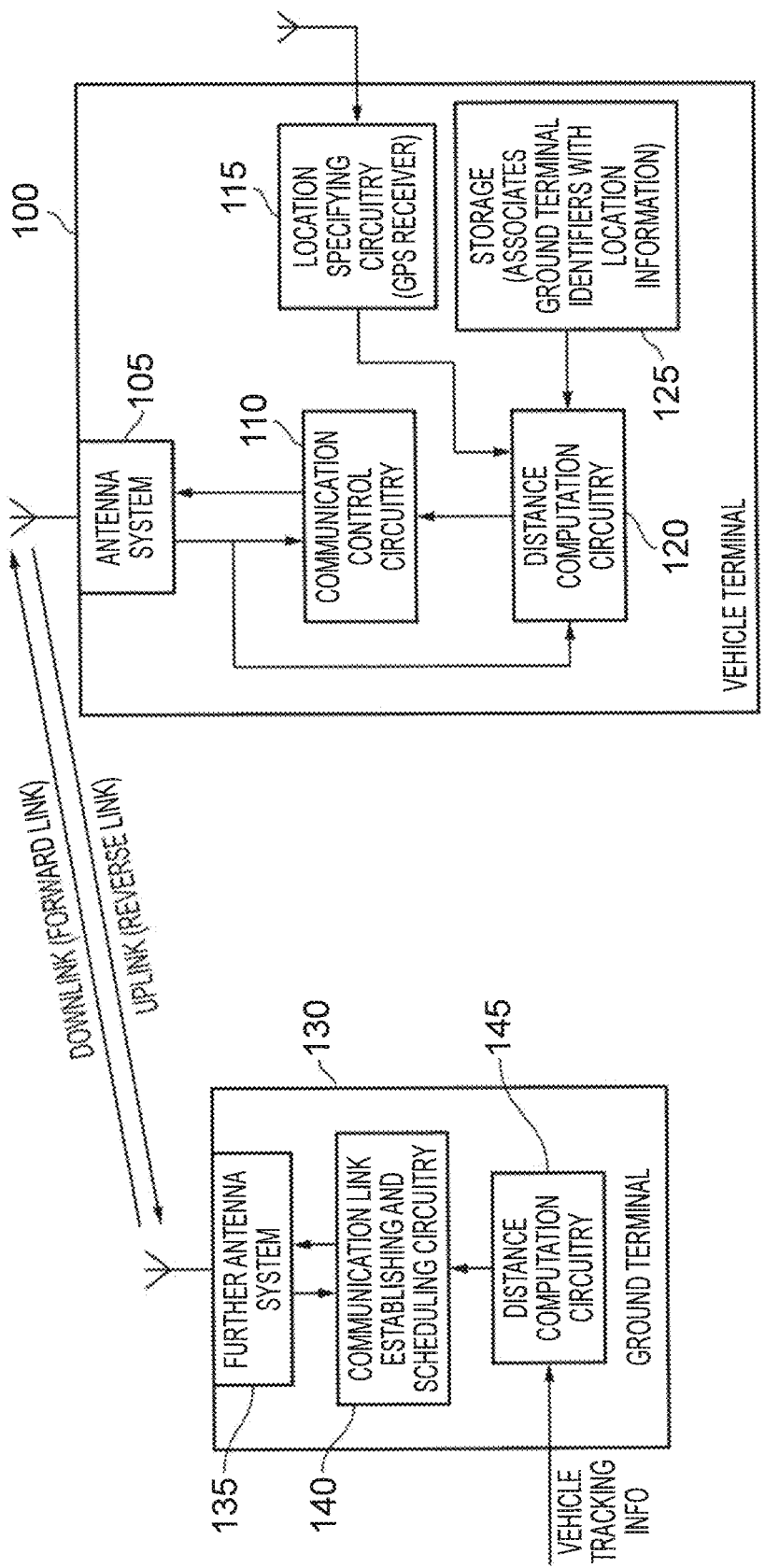
FIG. 3 is a block diagram illustrating components provided within a vehicle terminal and a ground terminal in accordance with one example arrangement.

FIG. 3 is a block diagram illustrating more details of the components provided within a vehicle terminal 100 and a ground terminal 130. The vehicle terminal 100 may for example be provided within the aircraft 10 shown in FIG. 1, whereas the ground terminal 130 may form the ground station 20 shown in FIG. 1.

The vehicle terminal 100 has an antenna system 105 used to communicate wirelessly with the ground terminal 130. The antenna system 105 may include all of the electronics used to convert between baseband and RF signals for both data to be transmitted from the vehicle terminal's antenna and for data received by the vehicle terminal's antenna. Communication control circuitry 110 is provided for controlling the operation of the antenna system 105. To assist the communication control circuitry 110 in performing the control operations to be described in more detail herein, the communication control circuitry 110 has access to distance computation circuitry 120 that can be used to determine the separation between the vehicle terminal 100 and the ground terminal 130. In some example implementations, that separation is expressed as a vector identifying the relative separation between the two antenna systems, whilst in other implementations that separation may be expressed as an absolute separation distance (i.e. a scalar term rather than a vector term).

The distance computation circuitry 120 may have access to location specifying circuitry 115 that can provide information identifying the current location of the vehicle terminal 100. The location specifying circuitry can take a variety of forms, but in one example implementation is a GPS receiver.

The distance computation circuitry 120 can be arranged to operate in a variety of ways, but in one example implementation extracts information from a downlink communication in order to seek to identify the location of the ground terminal 130. That information could in principle directly identify the coordinates of the ground terminal, but in one example implementation that information is an identifier of the ground terminal, and the distance computation circuitry uses that identifier in order to obtain the coordinates of the ground terminal.

In particular, as shown in FIG. 3, in one example implementation the vehicle terminal 100 has a storage device 125 providing a correlation between ground terminal identifiers and associated location information. Accordingly, a lookup operation can be performed within the storage using the identifier information extracted from the downlink signal, in order to obtain the location information of the ground terminal. Using that information, and the location information from the GPS receiver 115, the distance computation circuitry 120 can then calculate the separation between the vehicle terminal and the ground terminal.

As shown in FIG. 3, the ground terminal will include a further antenna system 135, which is controlled by communication link establishing and scheduling circuitry 140. The functionality performed by the communication link establishing and scheduling circuitry 140 will be discussed in more detail later. However, in one implementation that component has access to distance computation circuitry 145 that can compute the separation between the ground terminal 130 and the vehicle terminal 100. As with the earlier-discussed distance computation circuitry 120, the distance computation circuitry may produce that separation as a vector quantity, or as a scalar quantity dependent on implementation. In one example implementation, the distance computation circuitry will know the coordinate information of the ground terminal 130, which it will be appreciated is fixed, and will obtain vehicle tracking information indicative of the current location of the vehicle terminal 100. This vehicle tracking information can be obtained in a variety of ways. However, considering the example of an aircraft 10 shown in FIG. 1, it will be appreciated that there are available resources that track in real time the coordinates of aircrafts, and that information can be obtained in order to provide the distance computation circuitry 145 with the required vehicle tracking information for the vehicle terminal 100.

The separation between the ground terminal 130 and the vehicle terminal 100 determined by the distance computation circuitry 120 is calculated as a vector value, indicating both a magnitude (distance) and direction (angle). In one example implementation, analysis circuitry performs a Doppler adjustment process to determine an adjustment to be made to the transmission frequency of the uplink (reverse link) signal, based on the vector separation determined by the distance computation circuitry. The analysis circuitry therefore encompasses the distance computation circuitry 120 and at least some of the functionality of the communication control circuitry 110. The transmitted frequency ($f_t$) of the transmitted signal (uplink signal) is determined such that the observed frequency of the uplink signal when it is received by the further antenna system 135 equals a predetermined uplink frequency ($f_{UL}$); this is the frequency at which the ground terminal 130 expects to receive the uplink signal, corrected (by the Doppler adjustment process) to account for the Doppler effect in both the received and transmitted signals. The Doppler adjustment process is described in more detail with reference to the examples given below.

Figure 4:
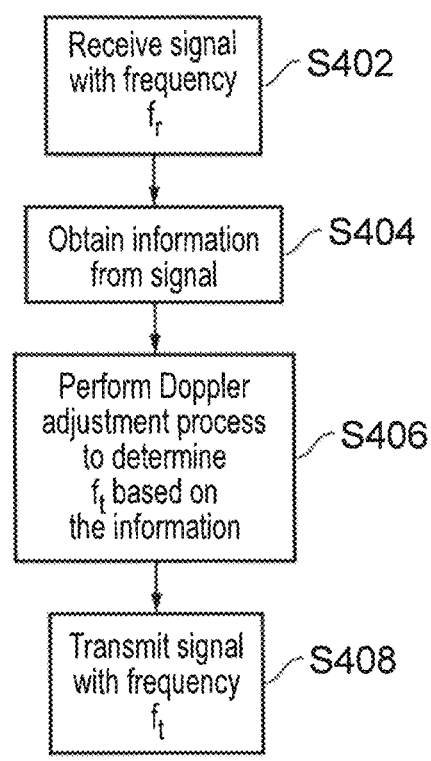
FIG. 4 is a flow diagram illustrating a process performed by the vehicle terminal to determine the transmission frequency ($f_t$) of a transmitted signal.

FIG. 4 is a flow diagram illustrating a method of operation of the vehicle terminal 100. In a first step S402, a received signal (the downlink/forward link signal) is received at the antenna of the antenna system 105, the received signal having a received frequency ($f_r$). At least one item of information—for example, information with which the distance computation circuitry 120 can determine the vector separation between the antenna system 105 of the vehicle terminal 100 and the further antenna system 135 of the ground terminal 130—is obtained at step S404 from the received signal by the distance computation circuitry 120. The information is then used in a Doppler adjustment process S406, to determine the transmitted frequency ($f_t$) with which the uplink signal is to be transmitted, taking into account any frequency shifts due to the Doppler effect.

Once the Doppler adjustment process S406 has been performed, then at step S408 the antenna system 105 can transmit, at the transmitted frequency ($f_t$), the uplink signal to the further antenna system 135.

Figure 5:
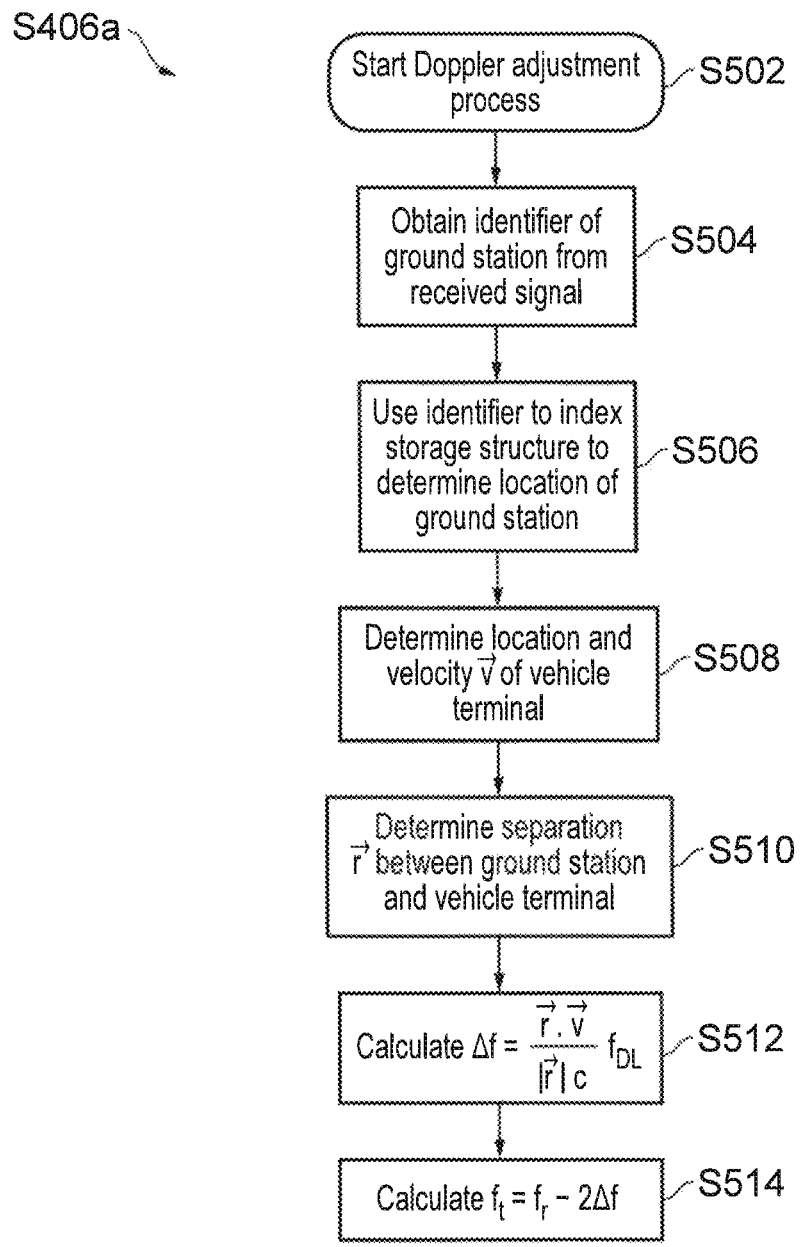
FIG. 5 is a flow diagram showing an example of a Doppler adjustment process performed by the vehicle terminal to determine the transmission frequency ($f_t$) of the transmitted signal.

FIG. 5 is a flow diagram showing an example of the Doppler adjustment process S406a referred to in FIG. 4. This particular example refers to the case where the information extracted from the received signal is an identifier of the ground terminal 130.

The Doppler adjustment process of this example starts at a step S502. At step S504 the distance computation circuitry 120 obtains, from the received downlink signal, an identifier of the ground terminal 135. Using this identifier, the computation circuitry 120 can then index the storage structure 125 in order to determine at step S506 the location of the ground station. The location of the vehicle terminal, along with its velocity, are also determined at step S508. At least the location can be determined by the location specifying circuitry 115, but in instances where the location specifying circuitry 115 is a GPS receiver it will be appreciated that the velocity information can also be determined from the output of the GPS receiver. Using the locations of the ground terminal 130 and the vehicle terminal 100, the vector displacement (separation) between the two terminals can be determined at step S510 by the distance computation circuitry 120, and thus an adjustment value ($\Delta f$) representative of the change in frequency of the received signal due to the Doppler effect can be calculated at step S512. This calculation is performed by the analysis circuitry according to the Doppler formula:

$$\Delta f = \frac{r \cdot v}{|r|c} f_{DL}$$

where r is the vector separation between the ground terminal 130 and the vehicle terminal 100, v is the velocity of the vehicle terminal 100, c is the speed of light and $f_{DL}$ is the predetermined downlink frequency (the frequency at which the ground terminal 130 transmits the downlink signal).

This adjustment value ($\Delta f$) is then used to calculate the transmitted frequency ($f_t$) with which the uplink signal is to be transmitted, in accordance with the following formula:

$$f_t = f_r - 2\Delta f$$

where $f_r$ is the received frequency of the downlink signal. The above calculations assume that a time division duplex (TDD) scheme is employed, in which the predetermined uplink frequency and the predetermined downlink frequency (the frequencies of the uplink and downlink signals at the ground terminal) are the same. The received frequency of the downlink signal is $f_r = f_{DL} + \Delta f$, and that received frequency is used as the default frequency for transmission from the vehicle terminal 100. Hence the frequency of the transmitted signal needs to be adjusted by $-2\Delta f$ in order to compensate for the Doppler effect in both the received and transmitted signals, such that the frequency of the uplink signal as observed by the ground terminal is $f_{UL} = f_{DL}$.

However, the above approach can also be generalised to a frequency division duplex (FDD) scheme where the predetermined uplink and downlink frequencies differ, as discussed below with reference to FIG. 9, and the adjustment required to the default transmission frequency in that case is the same.

While the example described with reference to FIG. 5 assumes that an identifier of the ground station 130 is obtained from the downlink signal, it is also possible for the downlink signal itself to specify the location (e.g. the coordinates) of the ground terminal 130. In this case, steps S504 and S506 in FIG. 5 would be replaced with a single step of obtaining, from the received signal, the location of the ground terminal 130.

Furthermore, in some examples it may also be possible to calculate the Doppler adjustment Δf without knowing the magnitude of the distance (r) between the two terminals, provided that at least the angle θ between the vehicle's velocity and a line connecting the two terminals is known. This is because the dot product between r and v can be calculated as |r|*|v|*cos θ, so that |r| cancels out in the Doppler formula. The angle θ could be calculated in any of a number of ways; for example, the angle of arrival (AoA) of the incoming downlink signal could be determined using a phase array, to determine the angle relative to the vehicle's heading.

Figure 6:
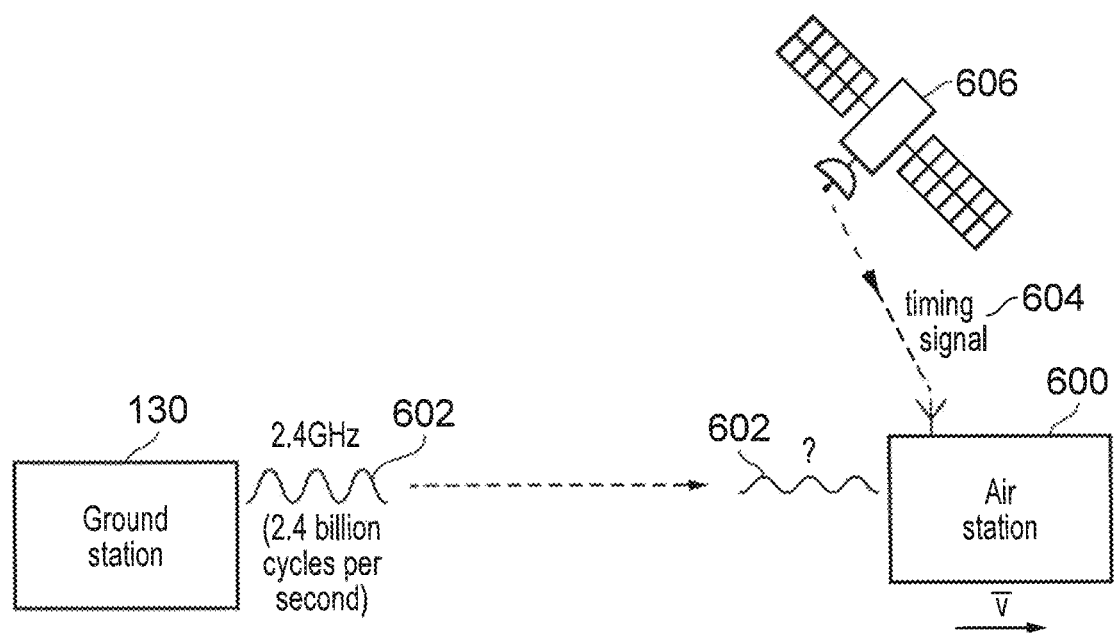
FIG. 6 schematically shows an example of how the Doppler effect affects signals from the ground station, and how the received signal can be used to determine the transmission frequency ($f_t$) of the transmitted signal.

The examples described so far involve calculating, with distance computation circuitry 120, the vector separation between the ground terminal 130 and the vehicle terminal 100. However, other examples instead perform the Doppler adjustment process using information about the received signal itself, rather than information about the ground terminal 130 (such as its location). One such example is demonstrated schematically in FIG. 6. A ground station 130 and an air station 600 (an example of the vehicle terminal 100 shown in FIG. 3) are shown in FIG. 6. The ground station 130 transmits a downlink signal 602 at a frequency (the predetermined downlink frequency $f_{DL}$) of 2.4 GHz (2.4 billion cycles per second). This signal is received a short time later at the air station 600, which is moving away from the ground station 130 with a given velocity (v). Due to the Doppler effect, the frequency of the signal as observed by the air station 600 is lower than 2.4 GHz (or higher if the air station 600 is moving towards the ground station 100), meaning that the number of cycles per second has reduced. In this example, the frequency ($f_r$) of the downlink signal 602 as observed by the air station 600 can be compared with the expected value of the frequency (2.4 GHz) to determine an adjustment (Δf) to be applied to the transmitted signal (not shown).

The air station 600 also receives a timing signal 604 from a GPS satellite 606, which provides accurate timing information. This timing information can then be used by the air station 600 (more particularly, by the analysis circuitry in the air station 600) to accurately count the number of cycles per second in the received signal 602, to determine how the frequency has changed. This information can then be used by the analysis circuitry to determine the transmitted frequency ($f_t$) of the transmitted signal. Thus, FIG. 6 is an example of the use of information relating to the received signal itself in performing a Doppler adjustment process.

While the arrangement shown in FIG. 6 calculates the received frequency ($f_r$) of the downlink signal as the information relating to the received signal, there are other examples of information about the received signal that could be used instead, for example the number of communication frames 60 received at the air station 600 per second (which can be compared to the expected value of 100 per second), the number of OFDM (Orthogonal Frequency Division Multiplexing) symbols received per second, or the number of primary synchronisation signals (PSSs) counted per second. In fact, any property of the received signal that is affected by the Doppler effect (so any property related to the frequency of the signal) can be used.

Figure 7:
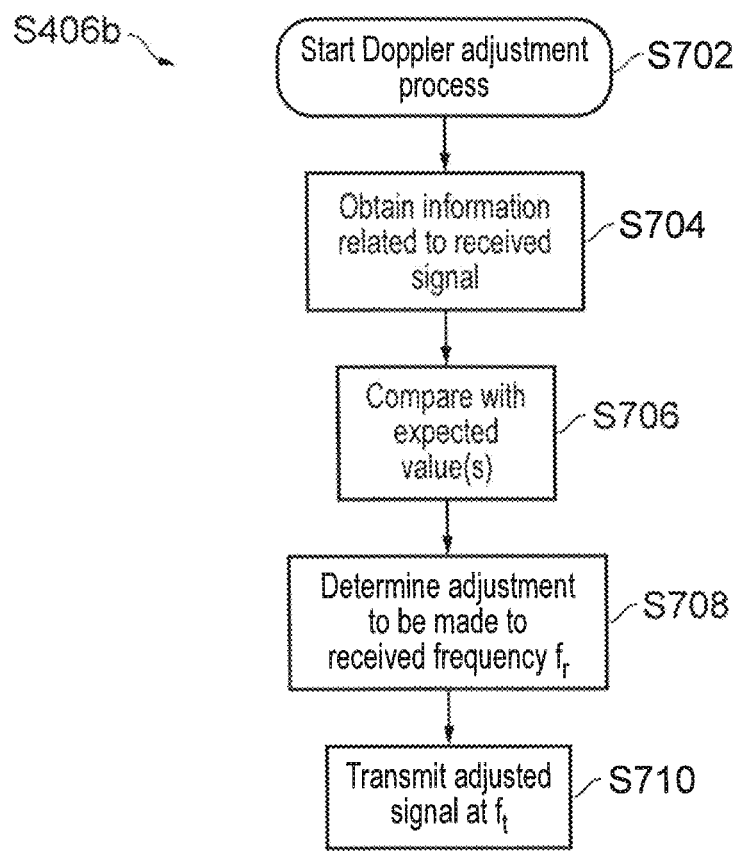
FIG. 7 is a flow diagram showing another example of a Doppler adjustment process performed by the vehicle terminal to determine the transmission frequency ($f_t$) of the transmitted signal.

FIG. 7 is a flow diagram illustrating another example of the Doppler adjustment process S406b applied in FIG. 4, this time using information relating to the received signal, rather than information about the ground terminal 130. In the following example, it is assumed that a TDD scheme is employed, and that the predetermined uplink frequency and predetermined downlink frequency are, therefore, the same.

In FIG. 7, the process begins at a first step S702, before passing to a step S704 of obtaining, from the received signal, information relating to the received signal itself. As mentioned above, this could include the received frequency ($f_r$) of the received signal, or any other property of the received signal impacted by the Doppler effect.

The obtained information is compared at step S706 with one or more expected values, allowing an indication of the Doppler effect on the received signal to be determined, and thus an adjusted transmission frequency ($f_t$) to be determined at step S708. Then, the antenna system 105 transmits the adjusted transmitted signal with transmission frequency ($f_t$).

Figure 8:
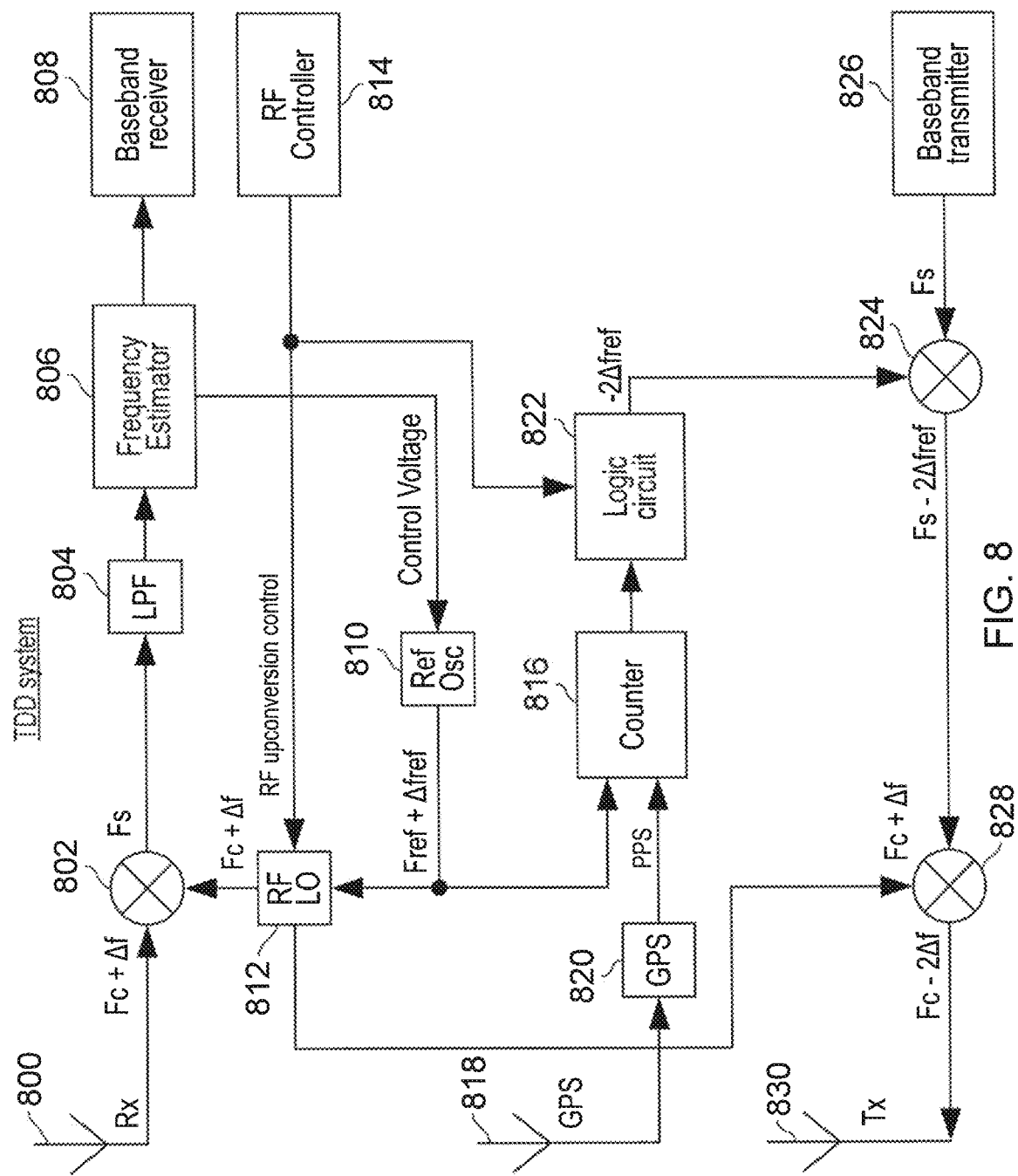
FIGS. 8 and 9 schematically show examples of components in the vehicle terminal, used in the process of determining the transmission frequency ($f_t$) of the transmitted signal.
Figure 9:
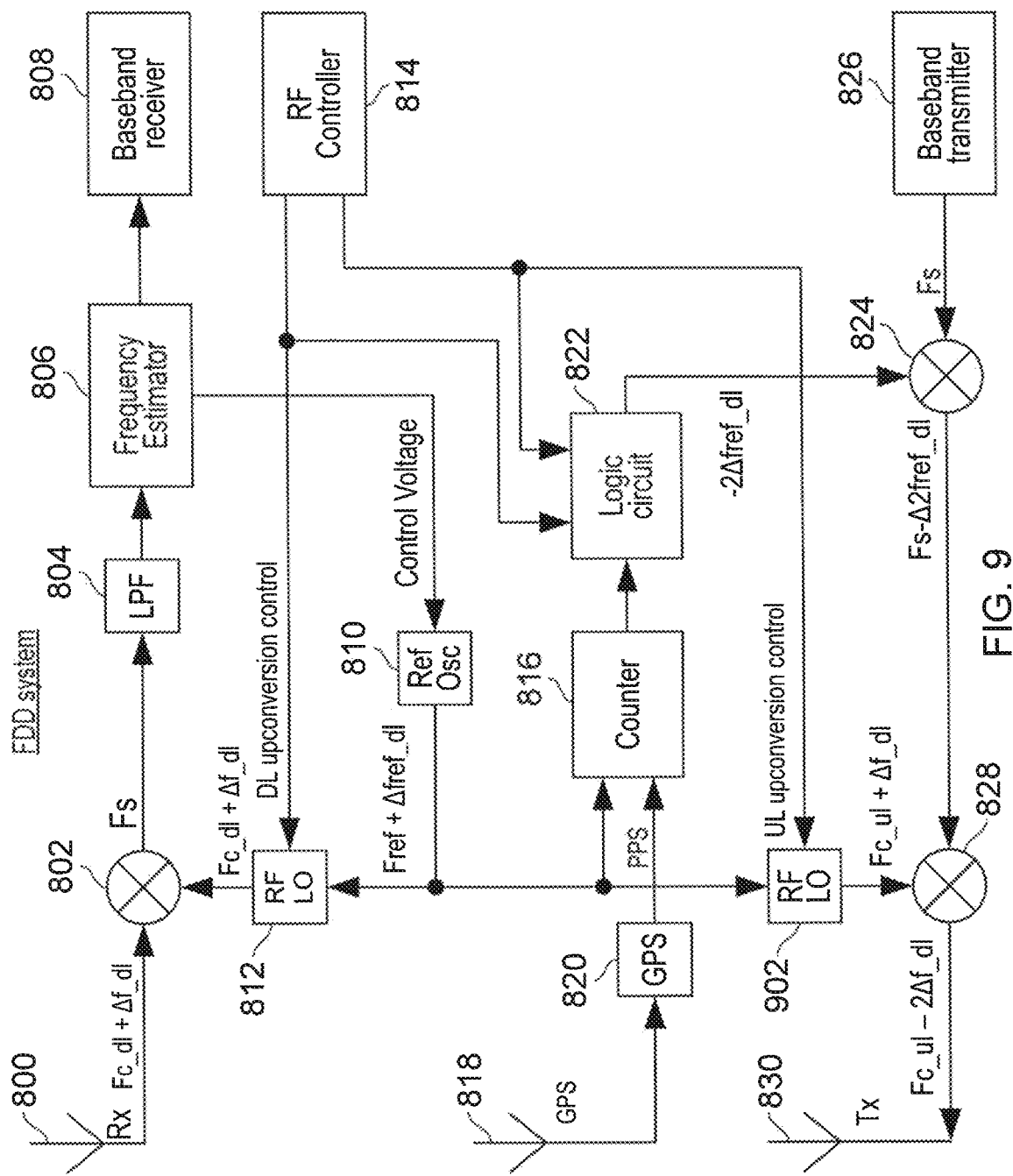

FIGS. 8 and 9 show in more detail some of the elements that may be present in the antenna system 105 and communication control circuitry 110 of the vehicle terminal 100, in accordance with the example described with reference to FIG. 7; in particular, FIGS. 8 and 9 describe components to be used in a system in which an indication of the received frequency ($f_r$) of the received signal is used to perform the Doppler adjustment process. FIG. 8 shows elements present in a vehicle terminal 100 to be used in a time division duplex (TDD) scheme, in which the predetermined uplink frequency and predetermined downlink frequency are the same while FIG. 9 shows an alternative arrangement to be used in a frequency division duplex (FDD) scheme, in which the predetermined uplink frequency and predetermined downlink frequency may be different. As noted above, the predetermined downlink frequency is the frequency with which the ground terminal transmits the downlink signal, and the predetermined uplink frequency is the frequency at which the ground terminal expects to receive the uplink signal.

In FIG. 8, the received signal Rx is received at an antenna 800, the received signal having a frequency equal to the carrier frequency ($f_c$) (the downlink frequency) adjusted according to the Doppler effect ($f_c$+Δf). The received signal is fed into a frequency mixer 802, the output of which is fed into a low pass filter (LPF) 804. The frequency estimator 806 estimates the frequency of the received signal based on the output of the LPF 804, and supplies the signal to a baseband receiver 808. The frequency estimator 806 also supplies a control voltage to a reference oscillator 810, to cause the reference oscillator 810 to then output a reference signal at a frequency ($F_{ref}$+Δ$F_{ref}$). The reference signal is fed into a local oscillator 812, which multiplies the reference frequency by an upscaling factor α and outputs the resulting signal—corresponding to an estimation of the frequency of the received signal—back into the frequency mixer 802. The upscaling factor α is determined based on an RF upconversion control signal received at the local oscillator 812 from an RF controller 814. Thus, the above process implements a feedback loop, and the frequency estimated by the frequency estimator 806 is more accurate with every pass.

The signal output by the reference oscillator 810 is also fed into a counter 816. A timing signal, received at a GPS antenna 818 and processed by a GPS element 820 is also fed into the counter 816. The timing signal provides one pulse per second (PPS), and hence, using the timing signal, the counter 816 can count the number of cycles per second in the reference signal output by the reference oscillator 810.

The counter 816 feeds into a logic circuit 822, controlled by the RF controller 814, which determines a downscaled adjustment value (2Δ$f_{ref}$). The downscaled adjustment value ($2\Delta f_{ref}$) and the output of a baseband transmitter 826 (having a frequency of $F_s$) are then fed into a second frequency mixer 824.

The second frequency mixer 824 then outputs a signal ($F_s-2\Delta f_{ref}$) to a third frequency mixer 828. The third frequency mixer 828 also receives an input from the local oscillator 812 (i.e. a signal representing the received frequency), and outputs a signal with frequency $F_c-2\Delta f$, which is the adjusted transmitted frequency described in earlier figures. This signal can then be transmitted as the uplink signal by an antenna 830.

The arrangement shown in FIG. 9 is almost identical to that shown in FIG. 8, with one main difference: the arrangement in FIG. 9 also includes a second local oscillator 902, which receives signals from the reference oscillator 810 and the RF controller 814. This allows for the signal fed into the third frequency mixer 828 ($F_{c\_ul}+\Delta f_{\_di}$) to take into account the difference in frequency between the uplink and downlink signals in an FDD system.

It should be noted that the frequency of the transmitted signal is adjusted by a value of $2\Delta f$, regardless of whether or not the downlink frequency $f_{DL}$ and the uplink frequency $f_{UL}$ are the same. This can be shown as follows:

The Doppler frequency on the Forward Link (FL) is given by:

$$\Delta f^{FL} = \frac{r \cdot v}{|r|c} f_c^{FL}$$

where $f_c^{FL}$ denotes the centre frequency on the forward link (downlink), c is the speed of light, v is the velocity vector and r is the relative distance to the base station. The (·) symbol denotes the dot product operator, wherein $r \cdot v = (r_x, r_y, r_z) \cdot (r_x, v_y, z_z) = r_x v_x + r_y v_y + r_z v_z$.

The Doppler frequency on the Reverse Link (RL), assuming that the carrier frequency is; $f_c^{RL}$, is given by:

$$\Delta f^{RL} = \frac{r \cdot v}{|r|c} f_c^{RL}$$

The reference oscillator will therefore converge to:

$$f^{REF} = (f_c^{FL} + \Delta f^{FL})/\alpha^{FL} = \left(1 + \frac{r \cdot v}{|r|c}\right) f_c^{FL}/\alpha^{FL}$$

where $\alpha^{GL}$ denotes the upscaling (multiplicative) factor for the forward link. For example, if $f^{REF}=40$ MHz, the $\alpha^{FL}=60$ to ensure the centre frequency will be at 2.4 GHz.

The received frequency at the base station (ground terminal) will be multiple of the reference frequency ($f^{REF}\alpha^{RL}$), adjusted by the Doppler effect. That is $$f^{RX-BS} = \left(1 + \frac{r \cdot v}{|r|c}\right) f^{REF} \alpha^{RL} = \left(1 + \frac{r \cdot v}{|r|c}\right)\left(1 + \frac{r \cdot v}{|r|c}\right) f_c^{FL} \frac{\alpha^{RL}}{\alpha^{FL}} =$$

$$\left(1 + 2\frac{r \cdot v}{|r|c} + \left(\frac{r \cdot v}{|r|c}\right)^2\right) f_c^{FL} \frac{\alpha^{RL}}{\alpha^{FL}} \approx \left(1 + 2\frac{r \cdot v}{|r|c}\right) f_c^{FL} \frac{\alpha^{RL}}{\alpha^{FL}}$$

$$\left(\frac{r \cdot v}{|r|c}\right)^2 \approx 0$$

since $v^2 \ll c^2$. To prove this assumption, assuming 1000 km/h at 2.4 GHz, $$\left(\frac{r \cdot v}{|r|c}\right)^2 f_c = 0.002 \text{ Hz}.$$

This is an insignificant contribution and can be ignored.

In TDD (time division duplex), $\alpha^{FL}=\alpha^{RL}$ and $f_c^{FL}=f_c^{RL}=f_c$, which implies that $\Delta f^{FL}=\Delta f^{RL}=\Delta f$, and thus $f^{RX-BS}=f_a+2\Delta f$.

Note that in FDD (frequency division duplex) (or TDD), $$f_c^{RL} = f_c^{FL}\frac{\alpha^{RL}}{\alpha^{FL}},$$

thus $$f^{RX-BS} = \left(1 + 2\frac{r \cdot v}{|r|c}\right) f_c^{RL} = f_c^{RL} + 2\Delta f^{RL}$$

Therefore, just like in the TDD case we need to compensate the transmission by $2\Delta f^{RL}$.

As shown through the above examples, the present technique allows the frequency of a signal transmitted by a wireless communication system installed in a fast-moving vehicle to be adjusted to compensate for the Doppler effect. This reduces interference effects at a ground terminal (base station), and allows higher frequency signals (such as those used in modern telecommunications Standards) to be used. It also allows the system to be used in vehicles of increasing speeds. Thus, modern telecommunications Standards such as 4G (LTE) can be implemented in ATG systems, even as the speeds with which modern aeroplanes travel are ever-increasing.

One of the functions performed by the communication control circuitry 110 is to perform a sign-on procedure to seek to establish a communication link with the ground terminal 130. During that sign-on procedure, the communication control circuitry 110 will issue a connection setup signal for receipt by the further antenna system 135 within an identified timing window. The vehicle terminal 100 will firstly receive an initial signal from the ground terminal 130 advising of the availability for the connection setup signal to be issued, and providing information regarding the identified timing window. The timing window will typically occupy one or more sub-frames, and the connection setup signal will have a duration less than the identified timing window, but will need to be received in its entirety within that timing window in order for a connection to successfully be established.

In accordance with the techniques described herein, it is assumed that communications are taking place in accordance with the 4G (LTE) Standard, and such a connection setup signal may be referred to as a RACH (random access channel) signal that is issued in a random access channel during an uplink communication from the moving vehicle to the ground terminal. Different RACH configurations may be supported, for example associated with different sized RACH signals and associated different sized timing windows.

Figure 10A:
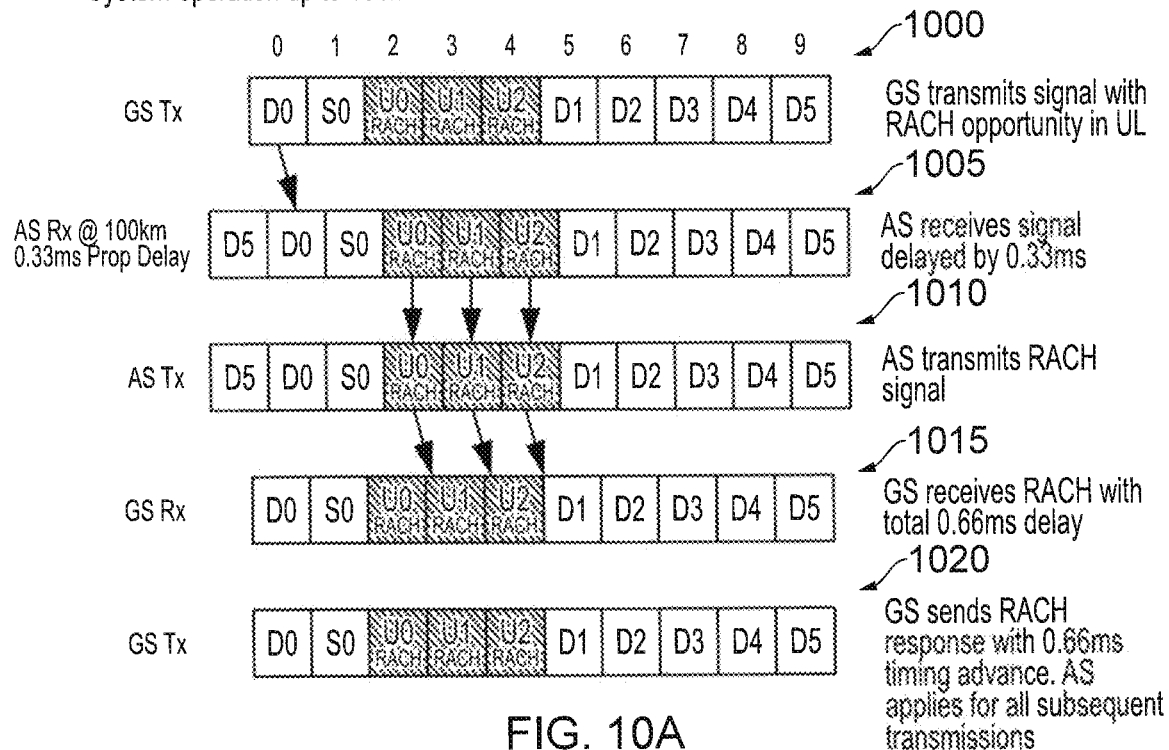
FIG. 10A illustrates how a connection setup signal (a RACH signal) can be successfully communicated from a vehicle terminal to a ground terminal using the communication frame of FIG. 2 provided the vehicle terminal is no more than 108 km from the ground terminal.

FIG. 10A illustrates an example form of RACH configuration that could be used when adopting the communication frame format of FIG. 2, and in situations where the separation between the aircraft 10 and the ground terminal 20 does not exceed 108 km. Here the timing window occupies three sub-frames. As indicated by the communication frame 1000, it is assumed that the ground station 20 transmits a signal identifying that there is a RACH opportunity that the aircraft can utilise in an uplink communication back to the ground terminal 20. As shown by the line 1005 in FIG. 10A, the receipt of the communication frame at the aircraft 10 is delayed by approximately 0.33 ms, due to the separation between the aircraft and the ground terminal (in this case it being assumed that there is essentially the maximum separation that can be supported using this RACH format). As shown by the line 1010, it is assumed that the aircraft 10 then transmits the RACH signal, in this case the RACH signal being propagated across all three of the uplink communication sub-frames.

It will be appreciated that that uplink transmission will also be delayed by the same propagation delay, and hence will be received by the ground terminal 20 at approximately 0.66 ms delay (as indicated by the line 1015), due to the round trip delay between the ground terminal and the aircraft. However, the timing control at the ground terminal is fixed, and hence it will assume the timing of the sub-frames is aligned with the initial timing shown by the entry 1000. Hence, it will interpret the received information on that basis.

In this case it is assumed that the RACH signal is received entirely within the RACH timing window, and based on the relative offset of that RACH signal, the ground station 20 can identify that the total propagation delay is 0.66 ms. Accordingly, in a subsequent communication frame 1020 where the ground station provides a response to identify that a successful communication link has been established, that response signal from the ground station will identify that the aircraft should advance its timing for subsequent uplink communication by 0.66 ms. As a result, this will ensure that the subsequent uplink communication is aligned with the sub-frame timing boundaries as implemented by the ground terminal 20.

Figure 10B:
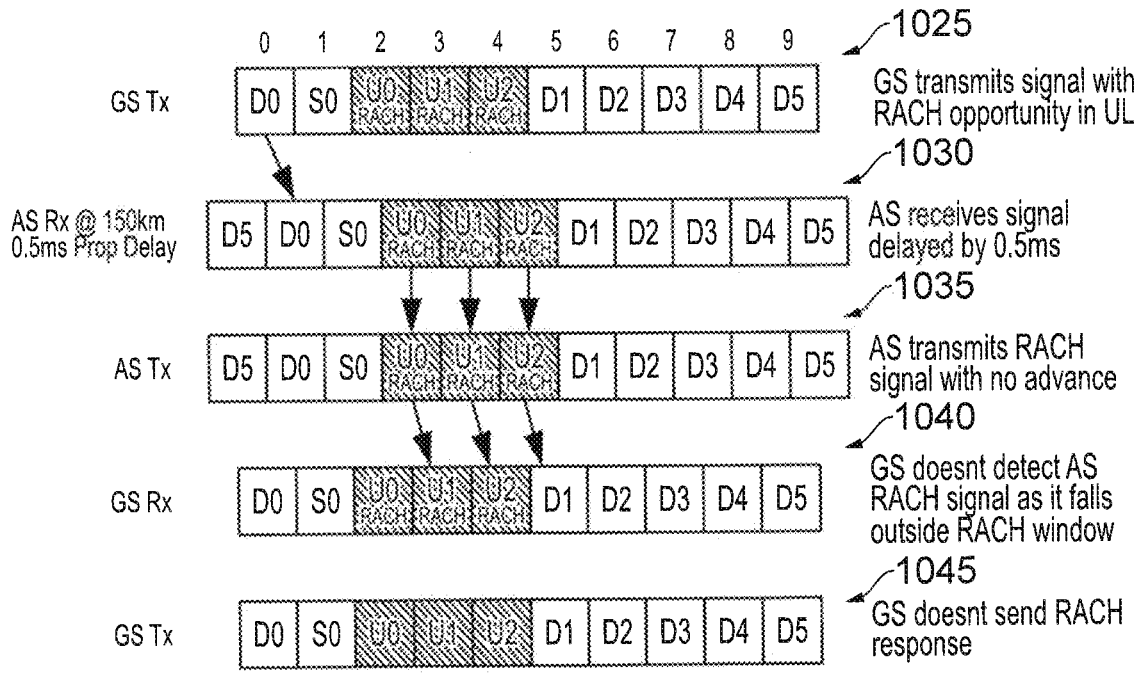
FIG. 10B illustrates how when the distance between the vehicle terminal and the ground terminal exceeds 108 km the connection setup signal will not be successfully received by the ground terminal when adopting the scheme of FIG. 10A.

FIG. 10B illustrates the use of the same example RACH configuration, but in a situation where the separation exceeds the maximum separation distance of 108 km. In this specific example, it is assumed that the separation is 150 km resulting in a 0.5 ms propagation delay from the ground terminal 20 to the aircraft 10. As shown by the line 1025, the ground terminal 20 emits the same initial signal as discussed earlier with reference to the line 1000 of FIG. 10A, and hence identifies a RACH opportunity. However, as shown by the line 1030, the communication frame is received after a 0.5 ms propagation delay. Again, as indicated by the line 1035, the aircraft terminal transmits the RACH signal within the uplink sub-frames, but again the communication is delayed by another 0.5 ms on its transit to the ground terminal. Hence, there has been an overall delay of 1 ms, and this results in the RACH signal not falling within the RACH timing window, when using the timing adopted by the ground station 20, as indicated by the line 1040. Accordingly, as indicated by line 1045, the RACH signal has not been successfully received, and the ground station 20 will not send a response to the aircraft, as a result of which a communication link will not be established.

In accordance with the techniques described herein, this problem is addressed by enabling the vehicle terminal to assess the separation between it and the ground terminal with which it is seeking to establish a communication, and to apply an initial timing advance relative to the default time indicated for the RACH signal, when issuing that RACH signal to the ground terminal. This can be used to ensure that the RACH signal is received within the specified timing window, hence enabling a successful communication link to be established. This process is discussed in more detail with reference to the flow diagram of FIG. 11.

Figure 11:
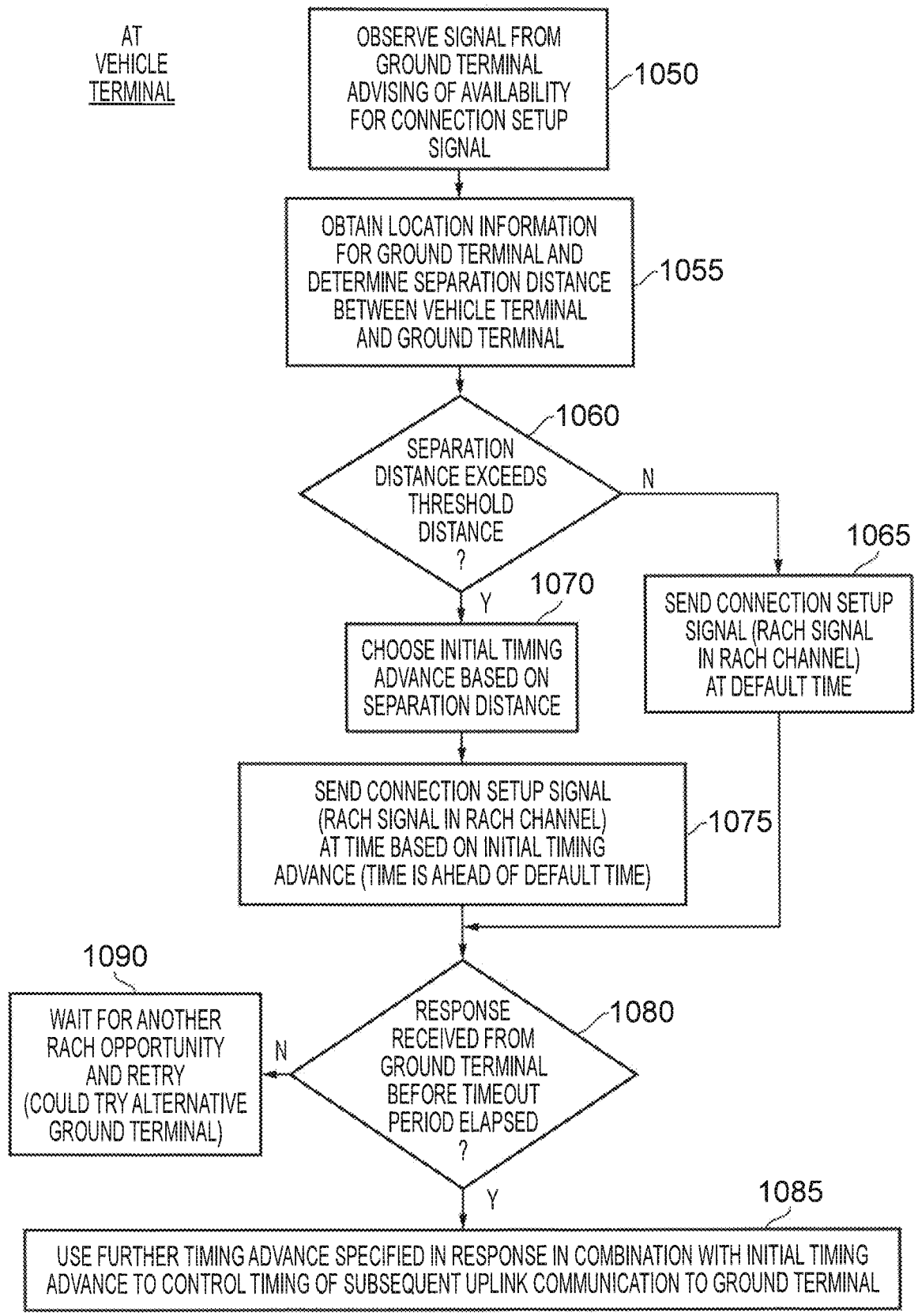
FIG. 11 is a flow diagram illustrating a process performed by the vehicle terminal in accordance with one example implementation, in order to ensure that the connection setup signal is successfully received by the ground terminal within an identified timing window even when the distance exceeds a setup threshold distance.

As shown in FIG. 11, at step 1050 the vehicle terminal 100 observes a signal from the ground terminal 130 advising of the availability for the issuance of a connection setup signal (a RACH signal). This information received by the vehicle terminal 100 also provides information about the default timing for issuing the RACH signal, the format of the RACH signal, and the format of the timing window.

At step 1055, the distance computation circuitry 120 obtains the location information for the ground terminal, and determines a separation distance between the vehicle terminal and the ground terminal. As discussed earlier, the distance computation circuitry 120 may refer to the storage 125 in order to obtain the coordinates of the ground terminal, based on that ground terminal's identifier included within the communication from the ground terminal, and can obtain information about the location of the vehicle terminal from the GPS receiver 115, hence enabling the separation distance to be determined.

At step 1060, it is determined whether the separation distance exceeds a setup threshold distance. If it does not, then the process proceeds to step 1065, where the connection setup signal is sent in the standard manner at the default timing, as per the process discussed for example earlier with reference to FIG. 10A. The setup threshold distance will depend on the RACH configuration used, i.e. the format of the RACH signal, and the size of the timing window, and the setup threshold distance will be determined not to have been exceeded if the separation distance is such that the RACH signal will be successfully received by the ground station if merely transmitted at the default timing specified by the signal received at step 1050.

However, if at step 1060 it is determined that the separation distance exceeds the setup threshold distance, then at step 1070 an initial timing advance is chosen based on that separation distance. There are a number of ways in which that initial timing advance can be determined, and one approach will be discussed later with reference to FIG. 14.

Once the initial timing advance has been determined at step 1070 then at step 1075 the RACH signal is sent in the RACH channel at a timing based on the initial timing advance. In particular, the default time is adjusted by the initial timing advance so that the RACH signal is issued ahead of the default time.

Due to the way in which the timing advance is chosen at step 1070, it will hence be ensured that the RACH signal will be received within the RACH timing window by the ground station 130 even though the separation distance exceeds the setup threshold distance.

Following either step 1065 or step 1075, the process proceeds to step 1080, where the vehicle terminal 100 waits to see if a response is received from the ground terminal before a timeout period has elapsed. In particular, even though the RACH signal will have been received within the required timing window, it is not guaranteed that the ground terminal will choose to establish a communication link with the vehicle terminal. For example, it may be that the vehicle terminal is contending with a number of other vehicle terminals to establish a communication link, and the ground terminal may choose to establish a communication link with one or more of those other vehicle terminals instead of the current vehicle terminal. For instance, certain vehicle terminals may be given priority over others, and hence it may be that the vehicle terminal being considered in FIG. 11 does not obtain a communication link at that time.

If the ground terminal chooses not to establish a communication link, it will not send a response back to the vehicle terminal, and accordingly if such a response is not received within a certain timeout period, the process proceeds to step 1090 where the vehicle terminal will wait to retry establishing a communication link.

It may be that at step 1090 the vehicle terminal waits for another RACH opportunity to be identified by the same ground terminal, and then retries establishing a communication link with that ground terminal. It could at that time take certain steps to increase the likelihood of it being allocated a communication link, such as for example increasing the power of the transmission so as to indicate to the ground terminal that a better quality communication link could be established. For example, in one implementation, the vehicle terminal estimates path loss and computes an initial RACH power for detection, selects a preamble from an available set of preambles and transmits it. If that RACH request is not successful, the vehicle terminal may autonomously choose another random preamble and increase its power for the next RACH opportunity. This can continue until the vehicle terminal's maximum transmit power has been reached.

However, the vehicle terminal is not limited to retrying to make a connection with the same ground terminal, and if it receives an initial signal from another ground terminal providing a connection setup opportunity, it could then seek to repeat the process of FIG. 11 in order to establish a link with that ground terminal.

If at step 1080 it is determined that a RACH response is received from the ground terminal, hence identifying that the ground terminal has accepted the establishment of a communication link with the vehicle terminal, then the communication control circuitry 110 within the vehicle terminal 100 will analyse the response in order to determine how to control subsequent communication with the ground terminal. In particular, a further timing advance may be specified in the response which should be used in combination with the initial (coarse) timing advance chosen at step 1070 to control the timing of subsequent uplink communication to the ground terminal. In addition, the response will typically provide information about which sub-frames are allocated to the vehicle terminal for downlink and uplink communications, so that the vehicle terminal can receive downlink communications destined for it as issued by the ground terminal 130, but can also issue its uplink communications within an appropriate sub-frame, using the cumulative timing advance determined at step 1085 so as to ensure that those uplink communications are received at the appropriate timing by the ground terminal 130.

It should be noted that while the information in the RACH response is used to provide a fine timing advance that can be combined with the coarse timing advance to determine the actual timing advance to be used for a subsequent uplink communication, as time progresses after the communication link has been established the distance between the aircraft and the ground terminal will change. This change can be compensated for using standard techniques provided by the 4G (LTE) Standard to make fine timing adjustments during the duration of the communications link.

Figure 12A:
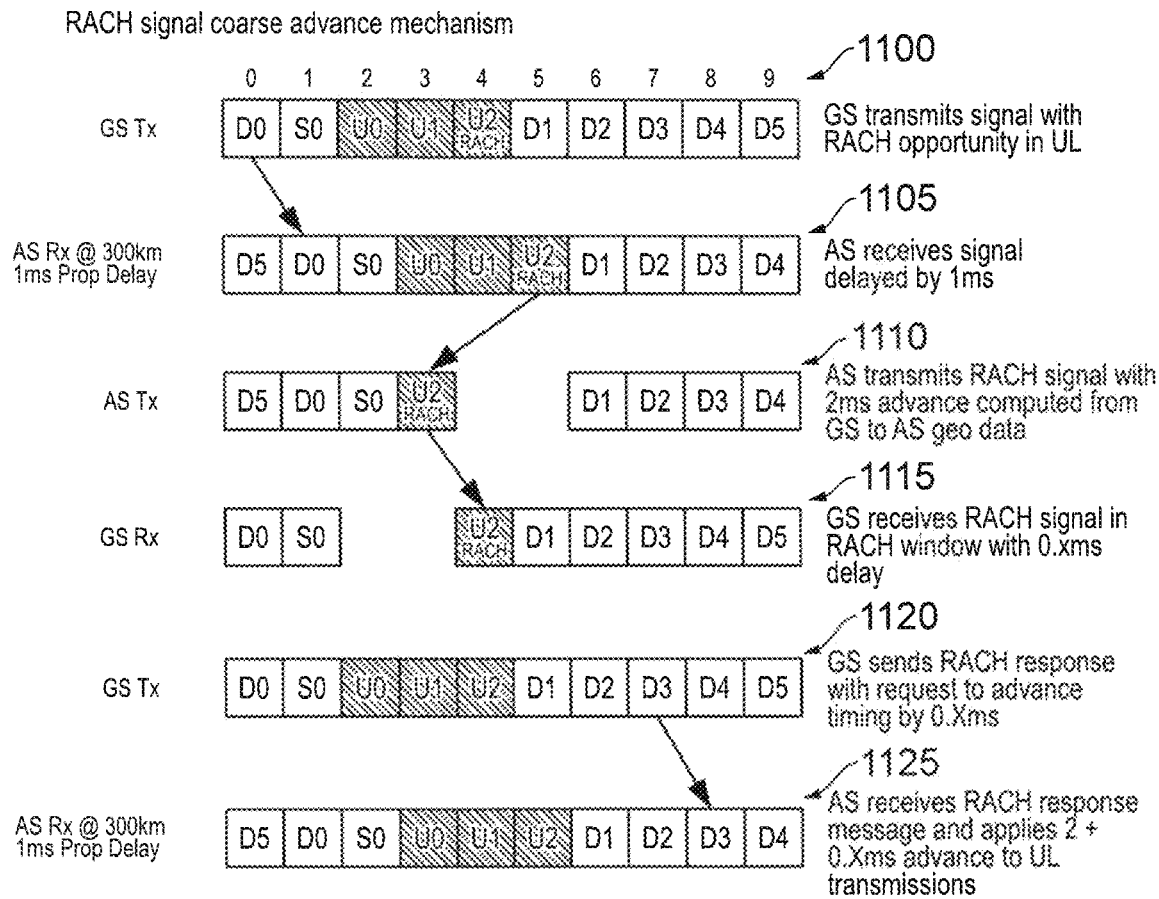
FIGS. 12A and 12B illustrate how the approach described in FIG. 11 ensures correct reception of the connection setup signal, and enables the provision of a suitable response from the ground terminal that allows a correct timing advance to be applied for future uplink communication to the ground terminal.

FIG. 12A illustrates how the process of FIG. 11 is applied for a particular implementation of the RACH signal and RACH timing window. In this example, it assumed that the RACH timing window is specified as coinciding with the third uplink communication sub-frame (U2), and that the RACH signal as transmitted will need to land entirely within that sub-frame in order for a successful communication to be established. As indicated by the line 1100, the ground station transmits a signal identifying the RACH opportunity that can be used within the uplink path. As indicated by the line 1105, due to the separation between the ground terminal 130 and the vehicle terminal 100, which in this case is assumed to be the maximum allowable distance of 300 km, the vehicle terminal 100 receives the communication frame delayed by 1 ms, and hence the communication frame is offset by a sub-frame width.

As indicated by the line 1110, because the separation distance exceeds the setup threshold distance at step 1060, an initial timing advance is chosen at step 1070 based on the separation distance, and in this case that initial timing advance will be chosen to be 2 ms. A full 2 ms advance can be applied without risk of violating a receive/transmit timing constraint, since even when the RACH signal is advanced by 2 ms, the vehicle terminal is not seeking to transmit that RACH signal at a time when it should be configured for receiving downlink communication, as is evident by the line 1110.

As indicated by the line 1115, that RACH signal will then actually be received with a 1 ms delay relative to its transmission time, which then realigns the RACH signal with the RACH timing window. Accordingly, the connection setup signal (the RACH signal) will be received, and accordingly a communication link can be established.

Assuming the ground terminal determines that a communication link is to be established with the vehicle terminal, then it will transmit a communication frame 1120 as a RACH response, which will be received with a 1 ms delay, as indicated by the line 1125. This can specify a fine timing advance if needed, which can be applied in combination with the coarse timing advance applied by the vehicle terminal to control subsequent uplink communications. The RACH response will also typically provide an indication of which sub-frames are allocated to the vehicle terminal for subsequent downlink and uplink communications.

Figure 12B:
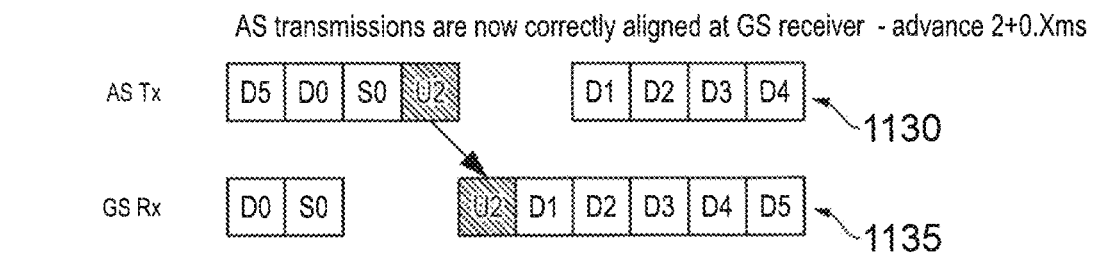

As indicated in FIG. 12B, it is assumed in this instance that the vehicle terminal is allocated as its uplink sub-frame the sub-frame U2, and will accordingly perform an uplink transmission at a timing indicated by the line 1130 for its subsequent uplink communications. As indicated by the line 1135 in FIG. 12B, due to the timing advance applied, this will ensure that the uplink communication is actually received at the correct timing by the ground terminal 130.

It should be noted that whilst in FIG. 12A it is assumed that the RACH configuration specifies that the RACH timing window is associated with the U2 sub-frame, as discussed earlier different RACH configurations can be used. For example, a RACH configuration may be used where the timing window is associated with both the U1 and the U2 sub-frames, with a longer RACH signal being issued, but with the requirement that a RACH signal lands in its entirety within the U1 and U2 sub-frames as per the timing adopted by the ground terminal 130. In another example, the RACH configuration may specify the use of all three uplink sub-frames as the RACH timing window, again with a longer RACH signal, but again with the requirement that that RACH signal lands entirely within the timing window as per the timing adopted by the ground terminal 130. The choice of RACH configuration will affect the setup threshold distance that is assessed at step 1060 of FIG. 11, and may affect the initial timing advance that is then chosen at step 1070 in situations where the distance exceeds the setup threshold distance.

For instance, whilst in the example of FIG. 12A the initial timing advance chosen based on the separation distance does not have to be constrained to take into account the requirement not to violate a receive/transmit timing constraint, with other RACH configurations the initial timing advance chosen may need to be constrained so as to ensure that the receive/transmit timing constraint is not violated. For example, it will be appreciated that if the RACH timing window occupies both the U1 and the U2 sub-frames, and a 2 ms advance was applied as per the example shown in FIG. 12A based on a separation distance of 300 km, this means that the transmission of the RACH signal will overlap with the S0 sub-frame. However, the receive/transmit timing constraint would then be violated if such an advance resulted in the need to transmit an uplink signal whilst the antenna system 105 should still be configured for downlink communication. In addition to the fact that it takes a finite time to perform the switch, as mentioned earlier it is also possible that some of the first symbols within the S0 sub-frame may be used for downlink communication, and accordingly in that instance it may not be appropriate to fully advance the initial timing by the timing that would be determined based purely on the propagation delay. Instead, it may be necessary to choose a slightly smaller coarse timing advance to avoid violating the receive/transmit timing constraint, whilst ensuring that that timing advance is sufficient to cause the RACH signal to be received within the RACH timing window. The further timing advance determined by the ground terminal will then compensate for the initial timing advance, so that cumulatively the initial and further timing advances will provide the required timing advance for subsequent uplink communication.

Figure 13:
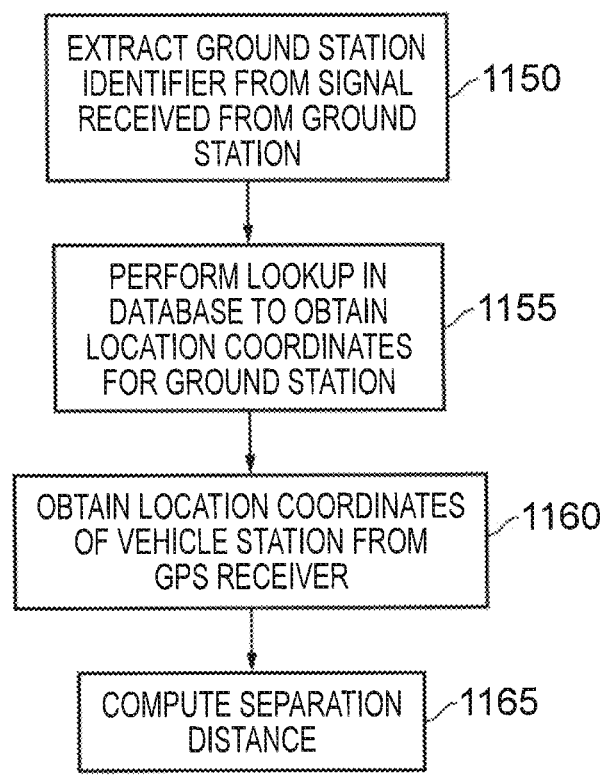
FIG. 13 is a flow diagram illustrating how step 1055 of FIG. 11 may be performed in accordance with one example implementation.

FIG. 13 is a flow diagram illustrating one way in which step 1055 of FIG. 11 may be performed. In this example, it is assumed that the initial communication from the ground station includes a ground station identifier. At step 1150, the distance computation circuitry 120 extracts that ground station identifier from the received signal, and then at step 1155 performs a lookup in the database provided within the storage 125 in order to obtain the location coordinates for the ground station.

At step 1160, the distance computation circuitry 120 then obtains location coordinates of the vehicle terminal 100 from the GPS receiver 115, and thereafter at step 1165 computes the separation distance between the ground terminal and the vehicle terminal.

Whilst the approach of FIG. 13 can be used in one example implementation, in an alternative implementation it may be that the initial signal from the ground terminal directly provided the coordinates of the ground terminal, and accordingly those coordinates could be extracted from the received signal at step 1150, and no lookup in the database would be required (hence step 1155 becoming redundant).

Figure 14:
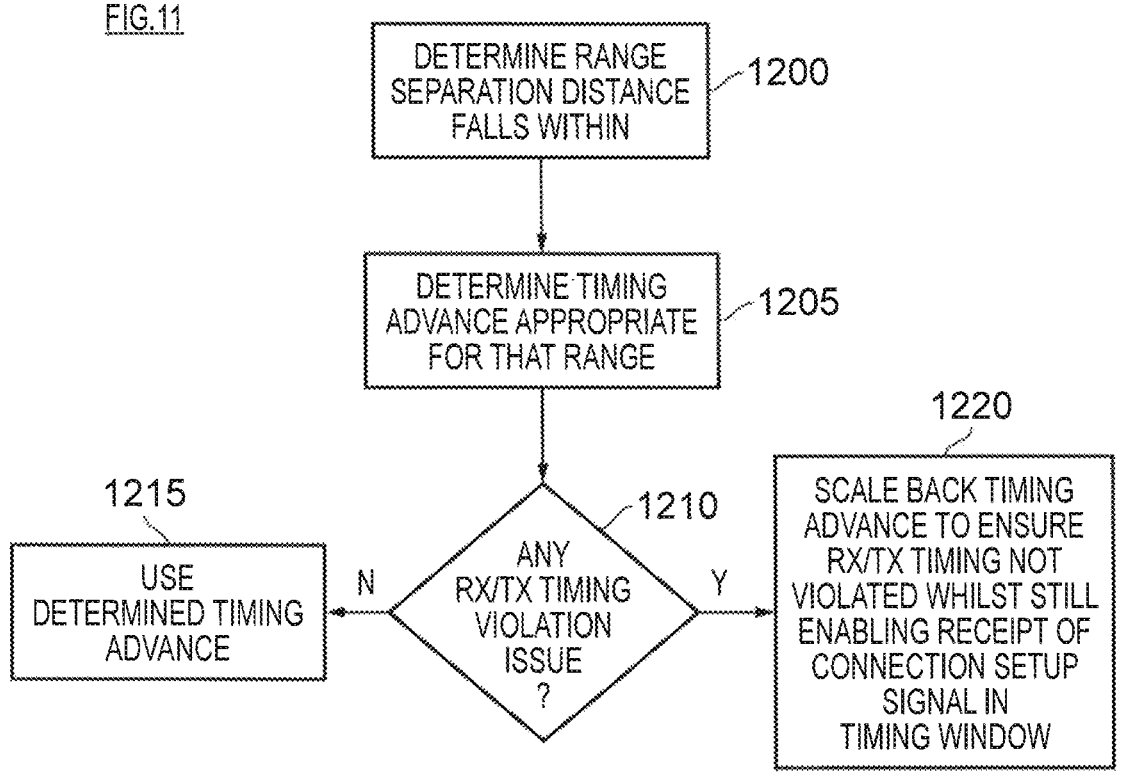
FIG. 14 is a flow diagram illustrating how step 1070 of FIG. 11 may be performed in one example implementation.

FIG. 14 is a flow diagram illustrating how step 1070 of FIG. 11 may be performed in one example implementation. At step 1200, it is determined which range of separation distances the separation distance falls within. Then, at step 1205 a timing advance appropriate for that range is determined. For instance, it could be that a lookup table is used that provides suitable coarse timing advances to be used for each of a number of different ranges. That lookup table could provide timing advances applicable for a number of different RACH configurations (i.e. for different formats of RACH signal and RACH timing window), with the lookup operation obtaining the timing advance appropriate for the determined range and RACH configuration.

However, in some implementations it may be determined that a lookup table approach based on ranges is not required, and instead the separation distance may be determined on the fly. In particular, an initial timing advance can be determined by dividing the separation distance by the speed of light.

As shown in FIG. 14, the process then proceeds to step 1210, where it is determined whether there is any receive/transmit timing violation issue. As discussed earlier, this may depend on the RACH configuration used and the separation distance in question. In particular, for RACH configurations that use multiple sub-frames, it may be the case that when the separation distance exceeds a certain amount, then there could be a receive/transmit timing violation issue if the timing advance determined at step 1205 was used "as is".

If it is determined that there is not any receive/transmit timing violation issue, then the process proceeds to step 1215 where the determined timing advance evaluated at step 1205 is used.

However, if it is determined that there is a receive/transmit timing violation issue, then at step 1220 the timing advance can be scaled back to ensure that the receive/transmit timing constraint is not violated, whilst still enabling receipt of the connection setup signal within the timing window.

In instances where the timing advance is encoded within a lookup table based on ranges of separation distance, then as mentioned earlier in one example implementation that lookup table will provide timing advance information for each of a number of different possible RACH configurations, and the prospect of violating receive/transmit timing constraints can be taken into account when populating the lookup table, so that in effect the evaluation at step 1210 is taken into account when initially populating the lookup table. In that event it will merely be sufficient to determine the range that the separation distance falls within and then obtain the appropriate timing advance to use from the lookup table at step 1205. Hence, in that case steps 1210, 1215 and 1210 would not be needed.

In one example implementation, when determining the appropriate timing advance to use, the aim is to try and land the connection setup signal within the middle of the specified timing window. By such an approach, this can allow for any inaccuracy in the timing advance applied, to ensure not only that the entire connection setup signal is received before the end of the timing window, but also that no portion of that connection setup signal is received before the start of the timing window.

It should be noted that the above coarse timing advance scheme can be applied to a wide variety of different communication schemes, for instance both TDD (time division duplex) and FDD (frequency division duplex) schemes. When employing an FDD scheme, the above-mentioned receive/transmit timing constraint issue may not apply as the antenna system can transmit and receive simultaneously, and hence steps 1210 and 1220 of FIG. 14 will not be employed.

Figure 15:
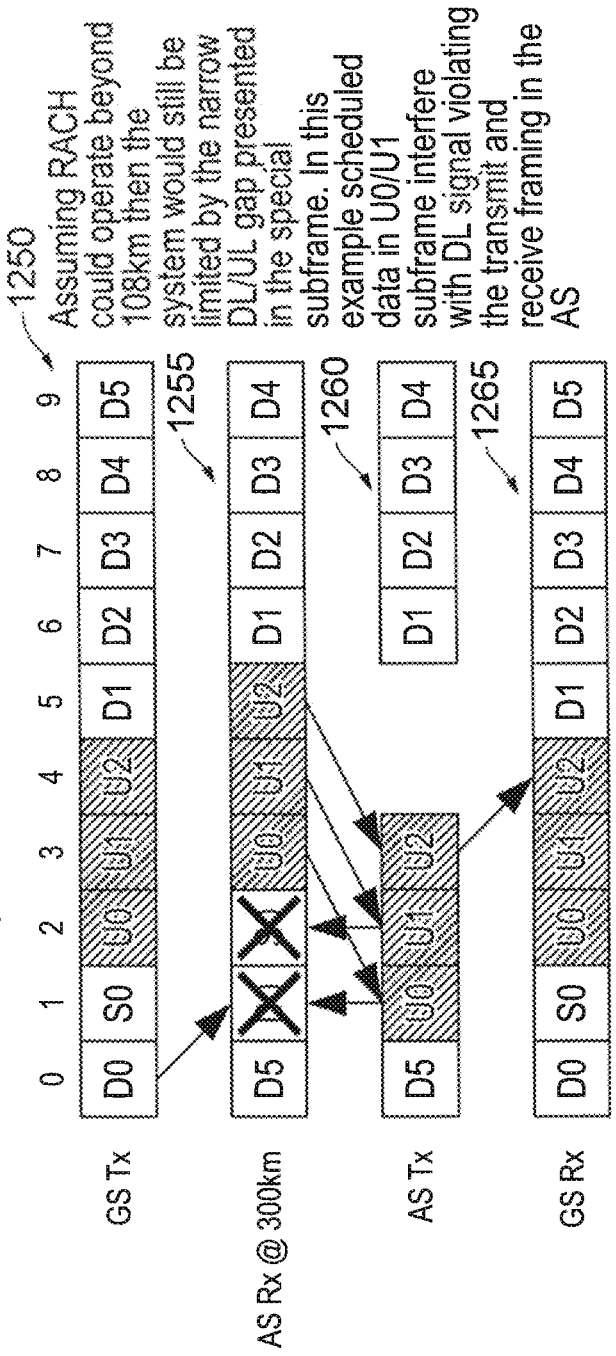
FIG. 15 is a diagram schematically illustrating a scheduling issue that can arise when the vehicle terminal is separated from the ground terminal by a distance exceeding a scheduling threshold distance.

Using the above described techniques, it is possible to establish a communication link with the ground terminal, even in situations where the separation distance between the aircraft 10 and the ground terminal 20 exceeds that supported using the standard RACH mechanism. However, as illustrated schematically in FIG. 15, a further problem that can arise is ensuring that in the subsequent uplink communications from the aircraft to the ground station 10 (using the cumulative timing advance obtained by combining the initial timing advance chosen by the vehicle terminal 100 with the fine timing advance specified in the RACH response), the earlier-mentioned receive/transmit timing constraint is not violated. In particular, as shown in FIG. 15, the communication frame format provides multiple sub-frames that can in principle be used for uplink communication, namely the sub-frames U0, U1 and U2 shown in the communication frame 1250. However, as indicated by the combination of the lines 1255 and 1260, if the scheduling circuitry 140 within the ground terminal 130 chooses to allocate resource blocks to the aircraft 10 within either the U0 or the U1 sub-frames, then if the aircraft separation distance from the ground terminal exceeds a scheduling threshold distance (in this example the scheduling threshold distance being 100 km), then the receive/transmit timing constraint would be violated.

In the example of FIG. 15, it is assumed that the separation distance between the aircraft 10 and the ground terminal 20 is 300 km, and hence from the earlier discussed FIG. 12A it will be understood that a timing advance of approximately 2 ms may be specified. However, this would overlap the sub-frames U0 and U1 with the downlink sub-frame D0 and the special sub-frame S0, and as discussed earlier the special sub-frame S0 may include some symbols transmitting downlink information. At any point in time, the antenna system 105 can only be configured for downlink communication or uplink communication, so this would violate the receive/transmit timing constraint, even though, as indicated by the line 1265, that timing advance would correctly align the uplink communications so that they are received in the relevant sub-frames U0, U1, U2 as per the timing employed by the ground terminal 130.

Figure 16A:
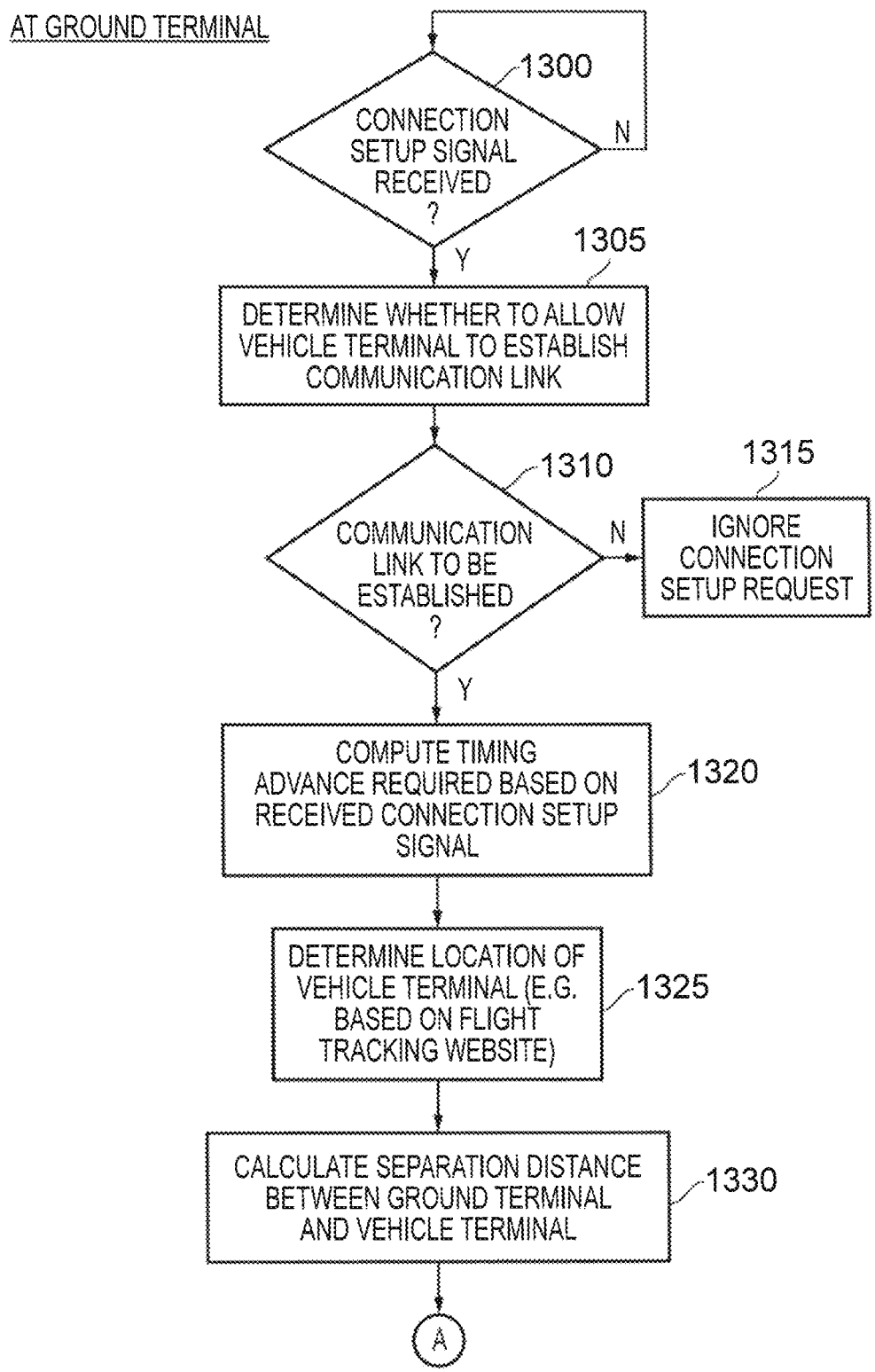
FIGS. 16A and 16B are a flow diagram illustrating a process performed by the ground terminal in order to resolve the scheduling issue illustrated in FIG. 15, in accordance with one example arrangement.
Figure 16B:
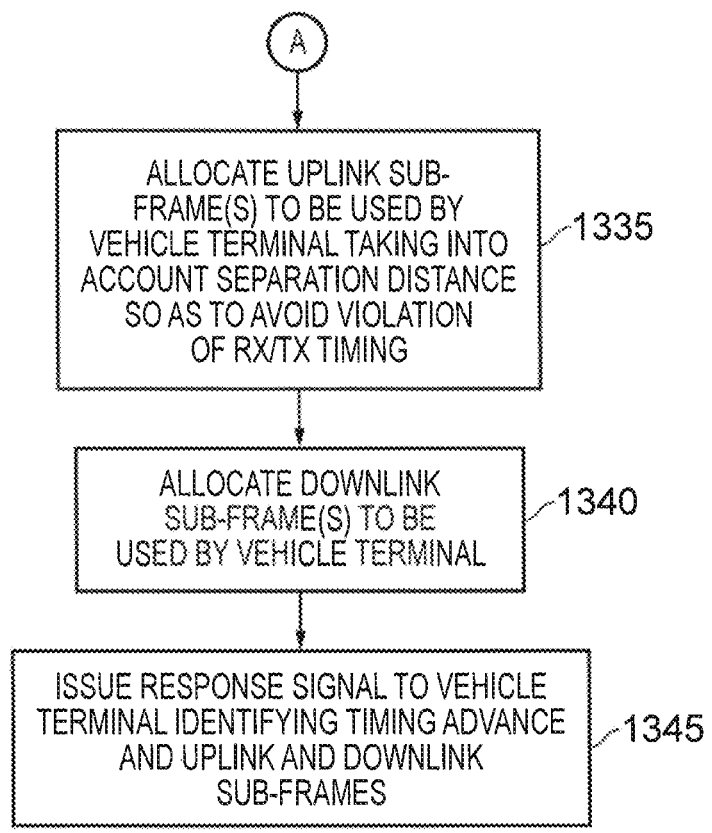

FIGS. 16A and 16B provide a flow diagram illustrating steps that can be performed by the ground terminal when determining how to schedule sub-frames to the vehicle terminal, in order to resolve the issue illustrated in FIG. 15. At step 1300, the ground terminal will await receipt of a connection setup signal, i.e. the earlier discussed RACH signal, from the vehicle terminal. Then, at step 1305 the ground terminal determines whether to allow the vehicle terminal 100 to establish a communication link with it. As discussed earlier, a number of criteria can be assessed here. For example, the quality of the communication link can be assessed, and factors such as other vehicle terminals that are seeking to establish a communication link can be considered when deciding whether to accept the establishment of a communication link with the vehicle terminal 100.

At step 1310, it is then concluded whether a communication link is to be established or not, and if not then at step 1315 the connection setup request is merely ignored. As will be apparent from the earlier discussed FIG. 11, this will result in no response being received by the vehicle terminal within a specified timeout period, and accordingly the vehicle terminal will proceed to step 1090 in order to seek to establish a communication link at a future time, either with that ground terminal 130, or with another ground terminal.

Assuming it is decided at step 1310 that a communication link is to be established, then at step 1320 the communication link establishing and scheduling circuitry 140 computes a timing advance required based on the received connection setup signal. In particular, based on the placement of the received RACH signal within the RACH timing window, a timing advance can be computed, this being the fine timing advance discussed earlier. At this stage, the computation performed by the communication link establishing and scheduling circuitry 140 does not need to take account of the actual separation distance between the aircraft and the ground terminal, since as discussed earlier that fine timing advance will be combined with any coarse timing advance initially chosen by the aircraft when sending the RACH signal, in order to determine the full timing advance to be used for subsequent uplink communication.

However, as discussed earlier care needs to be taken when scheduling uplink sub-frames for the aircraft to ensure that the receive/transmit timing constraint is not violated, and to assist in this process the ground terminal 130 does need to determine the separation between the vehicle terminal 100 and the ground terminal.

Accordingly, at step 1325 the ground terminal is arranged to determine the location of the vehicle terminal. In particular, the distance computation circuitry 145 discussed earlier in FIG. 3 can access information in order to determine the current position of the aircraft 10. There are a number of ways in which the vehicle location information can be obtained, but in one example a flight tracking web site may be accessed in order to obtain current coordinate information. Thereafter, at step 1330 the separation distance between the ground terminal and the vehicle can be determined. In particular, the location of the ground terminal 130 will be fixed, and accordingly can be used when computing the separation distance.

Then, at step 1335, one or more uplink sub-frames are allocated for use by the vehicle terminal taking into account the separation distance, so as to avoid violation of the receive/transmit timing constraint. In particular, in one example arrangement there may be multiple sub-frames that can be allocated for uplink communication, such as the three sub-frames U0, U1, U2 discussed earlier. Which of those sub-frames is used when allocating uplink resource for the aircraft 10 can take account of the separation distance. This will be discussed in more detail later by way of example with reference to FIGS. 17A to 17C. However, from the earlier-discussed FIG. 15, it will be appreciated that in the particular example chosen in FIG. 15 the scheduling circuitry could avoid allocating resource blocks within the sub-frames U0 and U1, so that the aircraft is only allocated resource blocks within the sub-frame U2, such that when the timing advance is applied the receive/transmit timing constraint will not be violated.

As indicated at step 1340, downlink sub-frames are also allocated to be used by the vehicle terminal for downlink communication from the ground station to the aircraft.

Once the uplink and downlink sub-frames have been allocated, then the response signal can be issued to the vehicle terminal at step 1345 identifying both the timing advance determined earlier at step 1320, and the uplink and downlink sub-frames that are to be used for subsequent communication with the aircraft.

Figure 17A:
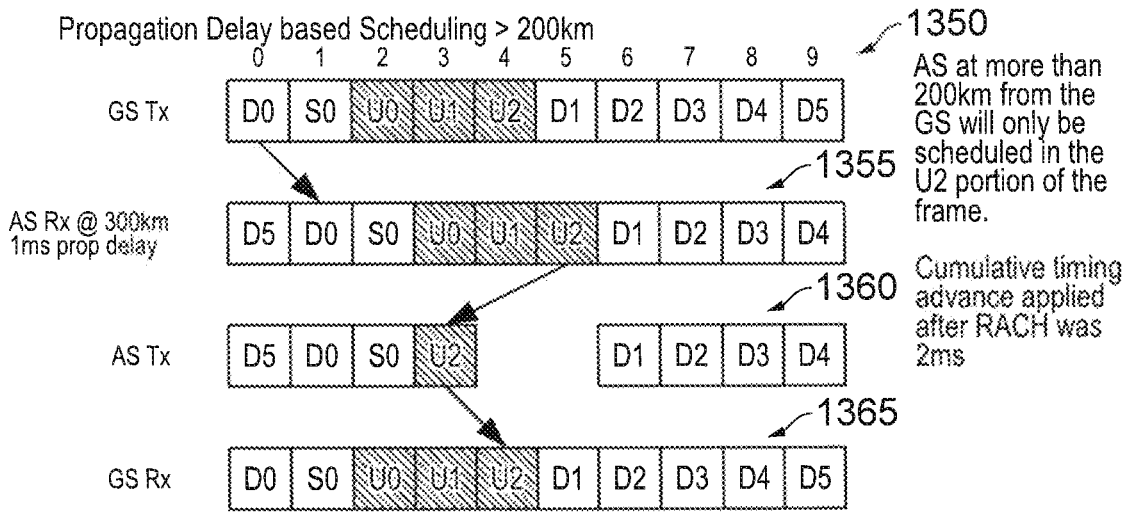
FIGS. 17A to 17C illustrate how the process of FIGS. 16A and 16B may be applied for various separation distances between the vehicle terminal and the ground terminal, in accordance with one example arrangement.
Figure 17B:
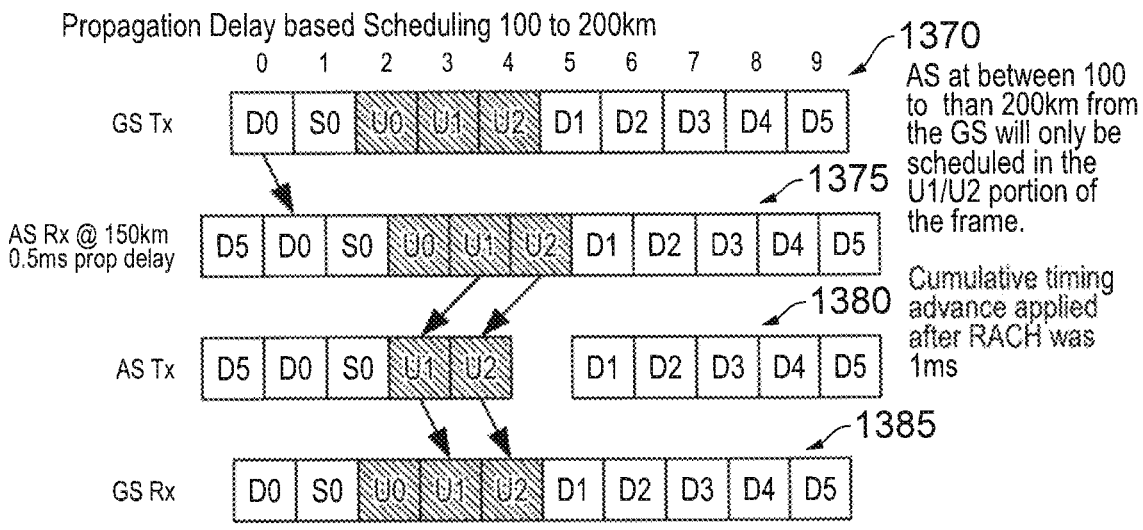
Figure 17C:
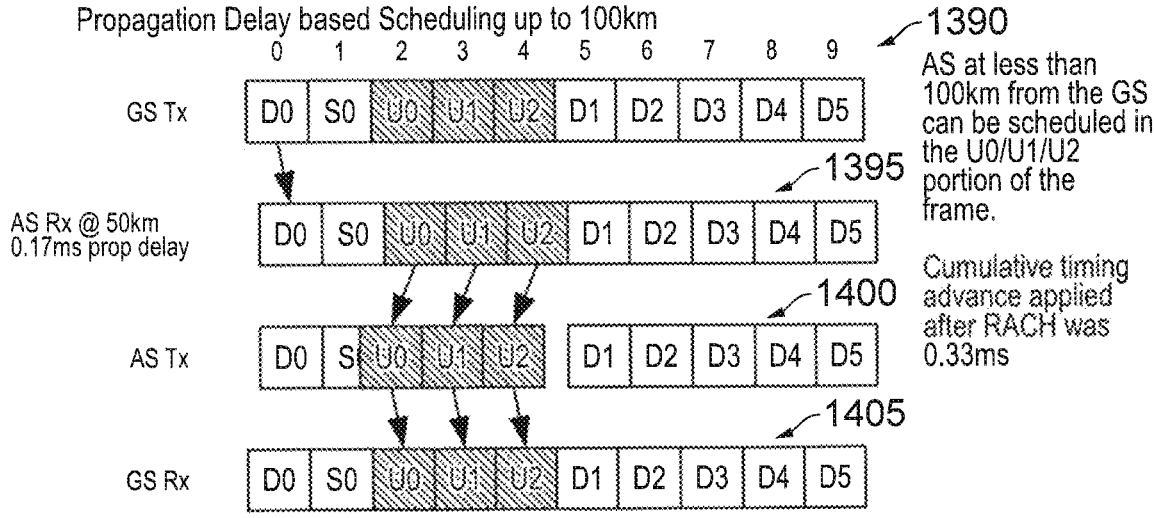

FIGS. 17A to 17C illustrate how uplink resource can be scheduled, assuming the communication frame format is as discussed earlier in FIG. 2, and accordingly there are three sub-frames that can in principle be used for uplink communication. As indicated in FIG. 17A, where it is determined that the aircraft 10 is at 300 km from the relevant ground terminal 20, the propagation delay is 1 ms, and accordingly the communication frame 1350 as transmitted by the ground terminal is received as shown by the line 1355, such that the communication is one sub-frame out relative to the transmission timing. In this example, it is assumed that the scheduling circuitry determines at step 1335 to allocate the U2 sub-frame to the vehicle terminal for use in uplink communication. As a result, as indicated by the line 1360, when the cumulative timing advance of 2 ms is applied, the downlink/uplink timing constraint is not violated. Hence, the uplink communication can be performed using this timing advance, and will ensure that it is correctly received by the ground terminal in the U2 sub-frame, as indicated by the line 1365. The approach shown in FIG. 17A can be used wherever the separation distance exceeds 200 km, provided the separation distance does not exceed 300 km.

FIG. 17B illustrates a scheduling approach that can be used when the separation distance is between 100 and 200 km. Again, the communication frame 1370 is transmitted from the ground terminal 20, and in this specific example it is assumed that the separation is 150 km, and hence the delay in receiving the communication frame is 0.5 ms as shown by the line 1375. In this scenario, the cumulative timing advance that will applied after the RACH sign-up process has been completed will be 1 ms. As a result, it is possible to accommodate uplink allocations in either or both of sub-frames U1 and U2 without violating the downlink/uplink timing constraint, as indicated by the line 1380. As shown by the line 1385, uplink communications in either of those two sub-frames will then be correctly received by the ground terminal 20.

FIG. 17C illustrates a scheduling scheme that can be used when the separation distance is less than 100 km. The communication frame 1390 is transmitted from the ground terminal, and in this instance it is assumed that the separation delay is 0.17 ms, this assuming the separation distance is 50 km. In this instance, any of the three uplink sub-frames U0, U1 or U2 can be allocated for uplink communication, since the cumulative timing advance after the RACH process has been performed will be 0.33 ms.

As shown by the line 1400, if the sub-frame U0 is used, this will cause some overlap of the U0 sub-frame transmission timing with the S0 frame. However, the extent of overlap still leaves some gap, and in particular does not overlap with any symbols within the S0 sub-frame that will be used for downlink communication, and accordingly the receive/transmit timing constraint is not violated. Further, as shown by the line 1405, any uplink communication of the three sub-frames U0, U1 or U2 will be correctly received by the ground terminal with the appropriate timing.

It is anticipated that the traffic between an aircraft and a connected ground terminal will be heavily downlink centric, for example to support the earlier-mentioned Wi-Fi connectivity for passengers within the aircraft. As will be apparent from the earlier-discussed frame format of FIG. 2, when using that frame format three sub-frames are reserved for uplink communication. This is required to allow for effective scheduling of uplink communications for aircrafts up to 300 km away from the ground terminal. However, in one example implementation the base station may be provided with the flexibility to alter the communication frame format under certain conditions, in order to allow for a larger proportion of the communication frame to be used for downlink traffic when possible.

Figure 18:
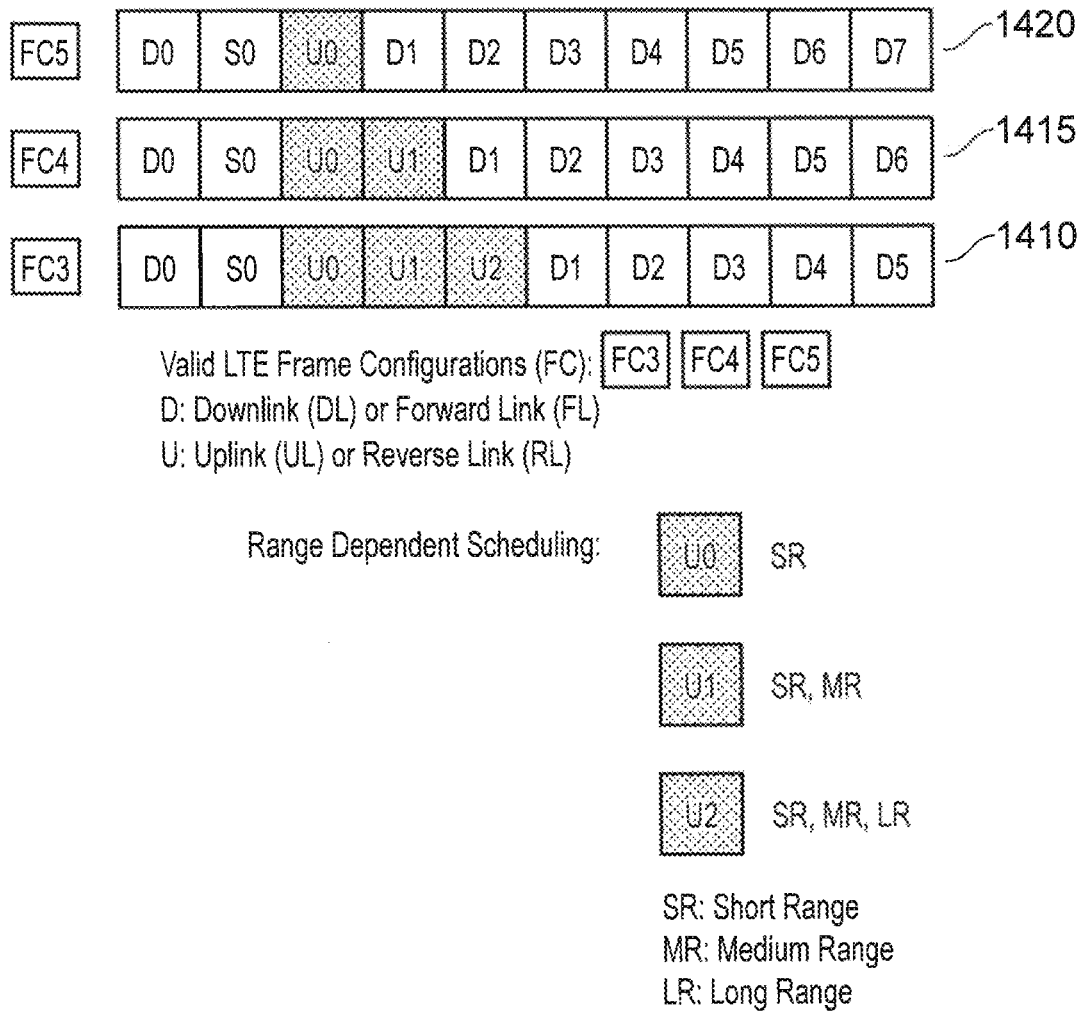
FIG. 18 illustrates multiple communication frame formats that can be supported in one example implementation.

FIG. 18 illustrates three example communication frame formats that may be used, each of which are supported LTE TDD (Time Division Duplex) frames. The frame format FC3 1410 is the format discussed earlier with reference to FIG. 2. The format FC4 1415 has one less uplink sub-frame and one more downlink sub-frame. Further, the frame format FC5 1420 has only a single uplink sub-frame, and an additional downlink sub-frame relative to the frame format FC4.

From the earlier scheduling examples illustrated with reference to FIGS. 17A to 17C, it will be appreciated that it is only when the separation distance exceeds 200 km (referred to in FIG. 18 as long range (LR)) that there is a need to schedule uplink communication in the last of the three uplink sub-frames, and hence the requirement to use communication frame FC3. When the distance is between 100 and 200 km (referred to in FIG. 18 as medium range (MR)), then uplink communication can be scheduled in the second uplink sub-frame, and hence it would still be possible to schedule uplink communications even if the communication frame format FC4 was used. Similarly, it will also be appreciated that if the communication frame format FC4 is used, uplink communication with aircraft up to 100 km away (referred to in FIG. 18 as short range (SR)) can also be accommodated when using the communication frame format FC4.

Finally, it will be appreciated that if the aircraft is less than 100 km away, then the communication frame format FC5 could be used, since uplink communication can be scheduled in the first uplink sub-frame (which happens to be the only uplink sub-frame in the frame format FC5).

Figure 19:
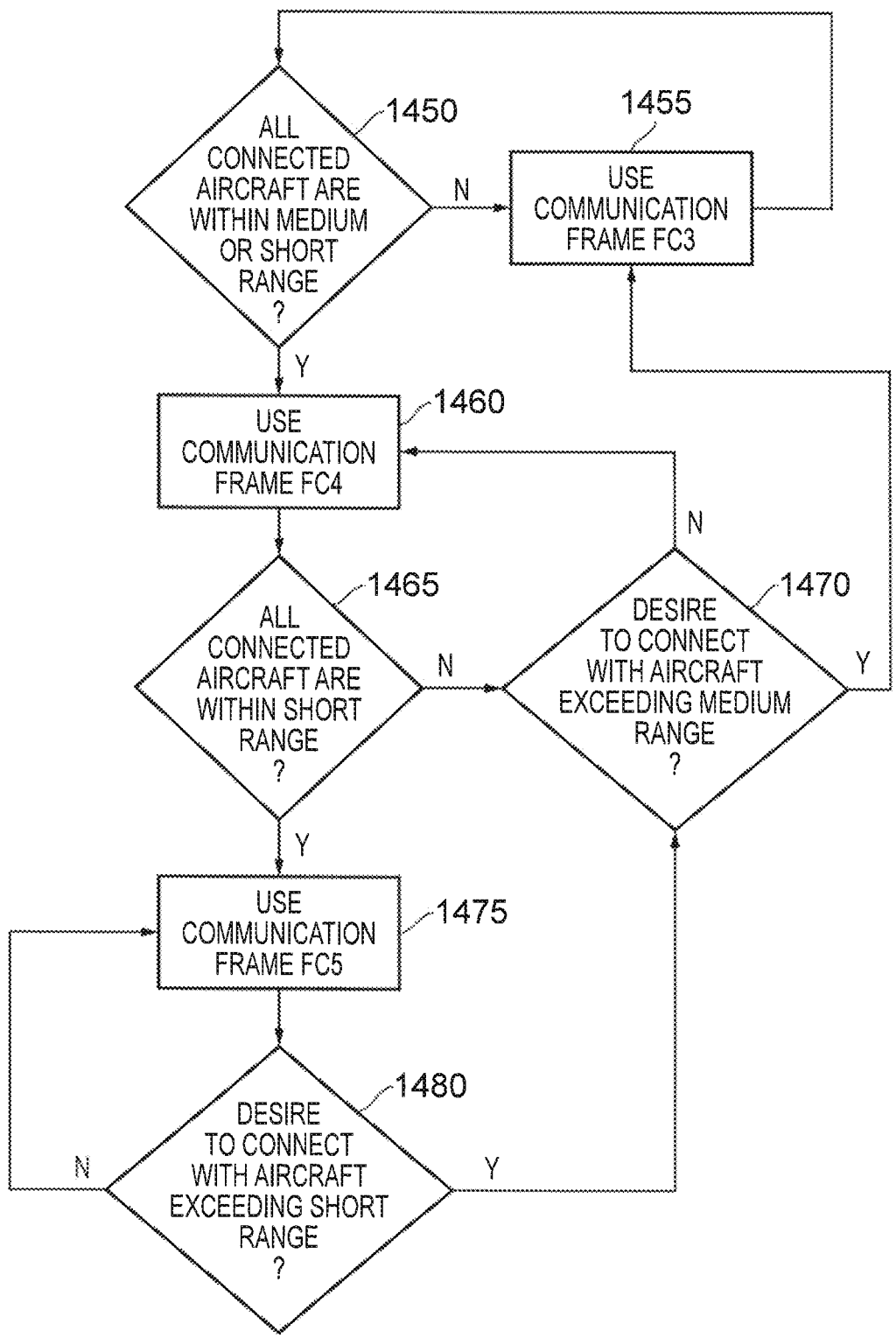
FIG. 19 is a flow diagram illustrating how the ground terminal in one example implementation can switch between the communication frame formats of FIG. 18 as separation distances permit, in order to seek to increase the proportion of the communication frame available for downlink communications.

FIG. 19 is a flow diagram illustrating how the ground terminal could make use of the three communication frame formats shown in FIG. 18 in order to facilitate a higher downlink capacity when the location of the connected aircrafts permits. At step 1450, it is determined whether all of the aircraft connected to that ground station are within the medium or short ranges. If not, then the communication frame FC3 is used at step 1455, and the process returns to step 1450.

However, if all of the connected aircraft are within the medium or short range, then the process can proceed to step 1460 where the aircraft terminal can switch to using communication frame FC4. A broadcast signal can be sent from the ground terminal to all of the connected aircraft terminals to advise them of the change in the communication frame. Once step 1460 has been implemented, it will be appreciated that there is an additional downlink sub-frame available when compared with the communication frame FC3.

Following step 1460, it can be determined at step 1465 whether all connected aircraft are within the short range. If not, it is then determined at step 1470 whether there is a desire to connect with an aircraft exceeding the medium range. For example, the ground terminal may receive a RACH signal from an aircraft within the long range seeking to establish a connection, and the ground terminal may decide that it wishes to service that request. Alternatively, it may be known that one of the already connected aircraft is about to leave the medium range into the long range, and it may be desirable to maintain connection with that aircraft. If it is determined at step 1470 that there is desire to connect with an aircraft exceeding the medium range, then the process proceeds to step 1455 where a switch is made to using the communication frame FC3. Again, a broadcast signal can be sent from the ground station to identify this change in the communication frame.

However, if at step 1470 it is determined that there is no desire to connect with an aircraft exceeding the medium range, then the process can merely return to step 1460.

If at step 1465 it is determined that all of the connected aircraft are within the short range, then the process can proceed to step 1475 where the communication frame FC5 can be used. Again, a broadcast signal can be sent from the ground terminal to advise of the change in the communication frame format.

Following step 1475, it can be determined at step 1480 whether there is a desire to connect with an aircraft exceeding the short range. If not, the process merely returns to step 1475 where the communication frame format FC5 continues to be used. However, if at step 1480 it is determined that there is a desire to connect with an aircraft exceeding the short range, then the process proceeds to step 1470 where the earlier-discussed analysis is performed.

Accordingly, by such an approach, it can be seen that the ground terminal can make use of multiple communication frame formats so as to seek to maximum the downlink capacity available, taking into account the separation between that ground terminal and the relevant aircraft. This can further improve capacity within the network.

In one example implementation where lookup tables are used to determine initial timing advances to be applied for RACH signals, those lookup tables can be updated as necessary dependent on the communication frame format currently being employed by the ground terminal.

From the above described examples, it will be seen that the techniques described herein enable for a timing adjustment to be made within a wireless communication system for a moving vehicle to enable wireless links to be established between the moving vehicle and a ground terminal, even when the separation distance between the moving vehicle and the ground terminal exceeds the maximum separation distance supported by the sign-on procedure when using the wireless communication Standard provided within the wireless network. Further, once such a link has been established, the scheduling of uplink resource to the aircraft can be adapted so as to ensure that receive/transmit timing constraints are not violated, even in situations where the separation distance exceeds the maximum separation distance supported by the telecommunications Standard.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A wireless communication system for a moving vehicle, comprising:
   an antenna system configured to receive a received signal from a further antenna system and to transmit a transmitted signal to the further antenna system;
   communication control circuitry to control operation of the antenna system; and
   analysis circuitry configured to:
      obtain at least one item of information from the received signal; and
      perform a Doppler adjustment process to determine, based on the at least one item of information, an adjusted received frequency ($f_r$) that influences reception of the received signal from the antenna system, such that an observed frequency of the received signal is a predetermined downlink frequency ($f_{DL}$).

2. A wireless communication system as claimed in claim 1, wherein the at least one item of information comprises at least one of:
   information relating to the further antenna system that enables a location of the further antenna system to be determined; and
   information about the received signal.

3. A wireless communication system as claimed in claim 1, wherein the at least one item of information comprises an identifier for the further antenna system.

4. A wireless communication system as claimed in claim 3, wherein the analysis circuitry is configured to determine, based on the identifier of the further antenna system, a location of further antenna system.

5. A wireless communication system as claimed in claim 4, comprising:
   a storage structure configured to store a plurality of entries, each entry identifying the location and the identifier of a respective further antenna system,
   wherein the analysis circuitry is configured to determine the location of the further antenna system by accessing the entry corresponding to the identifier in the storage structure.

6. A wireless communication system as claimed in claim 1, wherein the at least one item of information comprises a location of the further antenna system.

7. A wireless communication system as claimed in claim 1, comprising location specifying circuitry to identify a current location of the wireless communication system.

8. A wireless communication system as claimed in claim 7, wherein the location specifying circuitry comprises a GPS receiver.

9. A wireless communication system as claimed in claim 8, wherein:
   the at least one item of information comprises information relating to the further antenna system that enables a location of the further antenna system to be determined; and
   the analysis circuitry further comprises distance computation circuitry to determine a relative distance between the antenna system and the further antenna system based on the location of the antenna system and the determined location of the further antenna system.

10. A wireless communication system as claimed in claim 9, wherein the analysis circuitry is configured to perform the Doppler adjustment process based on the determined relative distance and a velocity of the antenna system.

11. A wireless communication system as claimed in claim 10, wherein the analysis circuitry is configured to perform the Doppler adjustment process by determining an adjustment value ($\Delta f$) representative of a change in frequency of the received signal due to a Doppler effect.

12. A wireless communication system as claimed in claim 1, wherein the predetermined downlink frequency ($f_{DL}$) is equal to a predetermined uplink frequency ($f_{UL}$) of signals transmitted by the antenna system to the further antenna system.

13. A wireless communication system as claimed in claim 1, wherein the moving vehicle is an aeroplane.

14. A wireless communication system as claimed in claim 1, wherein:
   the communication control circuitry is arranged to perform a sign-on procedure to seek to establish a communication link with the further antenna system, during which the communication control circuitry is arranged to issue via the antenna system a connection setup signal for receipt by the further antenna system within an identified timing window;

the wireless communication system further comprises:
- location specifying circuitry to identify a current location of the wireless communication system;
- distance computation circuitry to obtain location information specifying a location of the further antenna system and to determine a separation distance between the antenna system and the further antenna system; and
- the communication control circuitry is arranged to issue the connection setup signal at a default time unless the separation distance exceeds a setup threshold distance that indicates that use of the default time would prevent the connection setup signal being received within the identified timing window, in which event the communication control circuitry is arranged to apply a timing advance in order to issue the connection setup signal prior to the default time so as to cause the connection setup signal to be received by the further antenna system within the identified timing window.

15. A wireless communication system as claimed in claim 14, wherein an amount of the timing advance is dependent on the separation distance.

16. A wireless communication system as claimed in claim 15, wherein the communication control circuitry is arranged to determine the amount of the timing advance dependent on which of a plurality of ranges of separation distance the separation distance falls within.

17. A wireless communication system as claimed in claim 15, wherein the communication control circuitry is arranged to limit the amount of the timing advance so as to ensure that a receive/transmit timing constraint is not violated.

18. A wireless communication system as claimed in claim 17, wherein:
- communications between the antenna system and the further antenna system occur within communication frames;
- the antenna system is unable to transmit and receive signals simultaneously; and
- the receive/transmit timing constraint requires the antenna system to remain configured for reception during any portion of a communication frame where the antenna system may receive a downlink signal from the further antenna system.

19. A wireless communication system as claimed in claim 14, wherein communications between the antenna system and the further antenna system occur within communication frames, and the default time is a time relative to a start of the communication frame.

20. A wireless communication system as claimed in claim 14, wherein each communication frame comprises a plurality of sub-frames, and the identified timing window comprises one or more sub-frames.

21. A wireless communication system as claimed in claim 14, wherein:
- when a communication link is established between the antenna system and the further antenna system, the antenna system receives a response signal identifying a further timing advance; and
- the communication control circuitry is arranged, when the connection setup signal was issued by applying the timing advance, to use both the timing advance and the further timing advance to control timing of a subsequent uplink communication to the further antenna system.

22. A method of operation of a wireless communication system for a moving vehicle, comprising:
- receiving, at an antenna system of the wireless communication system, a received signal from a further antenna system;
- obtaining at least one item of information from the received signal; and
- performing a Doppler adjustment process to determine, based on the at least one item of information, an adjusted received frequency ($f_r$) that influences reception of a received signal from the antenna system, such that an observed frequency of the received signal is a predetermined downlink frequency ($f_{DL}$).

23. A wireless communication system for a moving vehicle, comprising:
- means for receiving a received signal from a further antenna system;
- means for obtaining at least one item of information from the received signal; and
- circuitry means for performing a Doppler adjustment process to determine, based on the at least one item of information, an adjusted received frequency ($f_r$) that influences reception of a received signal, such that an observed frequency of the received signal is a predetermined uplink frequency ($f_{DL}$).

* * * * *